United States Patent
Lee et al.

(10) Patent No.: US 11,244,339 B2
(45) Date of Patent: Feb. 8, 2022

(54) TOOL FOR GENERATING AND PUBLISHING VEHICLE OFFER

(71) Applicant: Constellation Agency, LLC, New York, NY (US)

(72) Inventors: Diana S. Lee, Cresskill, NJ (US); Matthew R. Woodruff, New York, NY (US)

(73) Assignee: Constellation Agency, LLC, New York, NY (US)

( * ) Notice: Subject to any disclaimer, the term of this patent is extended or adjusted under 35 U.S.C. 154(b) by 471 days.

(21) Appl. No.: 15/977,135

(22) Filed: May 11, 2018

(65) Prior Publication Data

US 2018/0330395 A1 Nov. 15, 2018

Related U.S. Application Data

(60) Provisional application No. 62/505,487, filed on May 12, 2017, provisional application No. 62/537,779, filed on Jul. 27, 2017.

(51) Int. Cl.
  *G06Q 30/02* (2012.01)
  *G06Q 30/06* (2012.01)
  *G06F 3/0482* (2013.01)

(52) U.S. Cl.
  CPC ....... *G06Q 30/0223* (2013.01); *G06F 3/0482* (2013.01); *G06Q 30/0611* (2013.01); *G06Q 30/0643* (2013.01)

(58) Field of Classification Search
  CPC ... G06Q 30/02; G06Q 30/0223; G06F 3/0482
  See application file for complete search history.

(56) References Cited

U.S. PATENT DOCUMENTS

| | | | |
|---|---|---|---|
| 2010/0217616 A1* | 8/2010 | Colson | G06Q 30/02 705/1.1 |
| 2014/0180834 A1* | 6/2014 | Baum | G06Q 30/0276 705/14.72 |
| 2016/0189260 A1 | 6/2016 | Nagla | |
| 2018/0012258 A1* | 1/2018 | Walker | G06Q 30/0265 |
| 2019/0172103 A1* | 6/2019 | Swinson | G06Q 30/0278 |

OTHER PUBLICATIONS

Schultze et al., "Electronic Commerce: The Impact of the Internet on Sales Practices in the Car Industry" (published in ICIS 2000 Proceedings, Dec. 2000, pp. 696-704) (Year: 2000).*
European Extended Search Report dated Jul. 3, 2018 received in European Patent Application No. 18 17 1838.8.

* cited by examiner

*Primary Examiner* — Abhishek Vyas
*Assistant Examiner* — Patrick Kim
(74) *Attorney, Agent, or Firm* — Scully, Scott, Murphy & Presser, P.C.

(57) ABSTRACT

A tool for generating and publishing vehicle offers by matching up manufacturer incentive data and vehicle data received from a third party data source with inventory data received from a dealership data source is disclosed. The disclosed tool allows a user to match incentive and vehicle data to specific vehicles currently in a dealership's inventory and to generate custom offers for those specific vehicles that uniquely identify the specific vehicles from dealership's inventory.

20 Claims, 30 Drawing Sheets

Fig. 12

TOOL FOR GENERATING AND PUBLISHING VEHICLE OFFER

CROSS-REFERENCE TO RELATED APPLICATIONS

This application claims the benefit of U.S. Provisional Application No. 62/505,487 filed on May 12, 2017 and U.S. Provisional Application No. 62/537,779 filed on Jul. 27, 2017, the entire contents of each of which are incorporated herein by reference.

BACKGROUND

The present disclosure relates to improvements in the systems and method used to generate and publish offers for vehicles.

When a dealership wishes to publish a new offer for a vehicle, the dealership often manually reviews monthly manufacturer incentives and manually applies the manufacturer incentives to determine pricing and other aspects for the offer. The offer information is then passed by the dealership to an agency to create an offer for publication, e.g., to social media or another advertising medium, or the dealership itself may manually build the offer itself and manually publish it.

BRIEF SUMMARY

The system, method, and computer program product described herein provide a tool for generating and publishing offers for vehicles by matching up manufacturer incentive data and vehicle data received from a third party data source with inventory data received from a dealership data source.

In an aspect of the present disclosure, a method for generating and publishing an offer for a vehicle is disclosed. The method includes receiving from a first data source, a plurality of incentives offered by an vehicle manufacturer for vehicles produced by the vehicle manufacturer, receiving from a second data source, inventory data comprising data about a plurality of vehicles currently in stock at an vehicle dealership, and causing a computing device associated with the vehicle dealership to present, via a display device, a graphical user interface to a user. The graphical user interface may include an element activatable by the user to select a vehicle of the plurality of vehicles for the generation of an offer. The method may further include receiving, from the computing device associated with the vehicle dealership, an activation of the element by the user. The activation may select the vehicle for generation of an offer. The method further includes determining, based on the plurality of incentives, at least one incentive for the selected vehicle and causing the computing device associated with the vehicle dealership to present to the user, via the graphical user interface, the at least one incentive for the selected vehicle. The method further includes receiving, from the computing device associated with the vehicle dealership, a selection by the user of at least one of the incentives for the selected vehicle and generating an offer for the selected vehicle based on the selected vehicle and the selected at least one of the incentives. The method further includes causing the computing device associated with the vehicle dealership to present to the user, via the graphical user interface, the generated offer to the user and receiving, from the computing device associated with the vehicle dealership, an acceptance of the generated offer by the user. The method further includes causing the computing device associated with the vehicle dealership to present to the user, via the graphical user interface, at least one audience setting for the generated offer. The at least one audience setting includes a setting identifying a target audience. The method further includes receiving, from the computing device associated with the vehicle dealership, a selection of the at least one audience setting by the user and publishing the generated offer to the target audience identified in the selected at least one audience setting.

In some aspects, the inventory data may include an identifier for each vehicle currently in stock at the vehicle dealership that uniquely identifies each vehicle. In some aspects, the generated offer may include the identifier that uniquely identifies the selected vehicle.

In an aspect, the identifier may include the vehicle identification number (VIN) for the selected vehicle.

In an aspect, the method may include receiving vehicle data from the first data source for the selected vehicle. In some aspects, the vehicle data may include a plurality of images of the selected vehicle. In yet another aspect, the generated offer may include at least one of the images of the selected vehicle.

In some aspects, the first data source is run by a third party that is different than the vehicle manufacturer and the vehicle dealership.

In some aspects, the generated offer may include at least one component. In a further aspect, the generated offer may be generated based on at least one component template. In yet a further aspect, the at least one component template may define a format for the at least one component of the generated offer.

In a further aspect, the at least one component may include an image of the selected vehicle, the selected at least one of the incentives, and a unique identifier of the selected vehicle. In some aspects, the at least one component template may define a position of each of the image of the selected vehicle, the selected at least one of the incentives, and the unique identifier of the selected vehicle in the generated offer.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can best be understood by referring to the accompanying drawings, in which like reference numbers and designations refer to like elements.

FIGS. 2-28 illustrate an example graphical user interface of an offer generating tool implemented by the system of FIG. 1 in accordance with aspects of the present disclosure.

DETAILED DESCRIPTION

Auto dealerships face a challenging task of efficiently publishing up to date offers that include the latest manufacturer incentives while also taking into account dealership specific inventory and other customizations and offerings. For example, offers may need to be updated or replaced as new manufacturer incentives are released or as old manufacturer incentives expire, e.g., weekly, monthly, around holidays or other special events, or for any other reason. In addition, as inventory is sold off and new inventory is added, offers may need to be updated or replaced with offers that reflect the new inventory state.

In some cases, states or other jurisdictions may have laws which require any offers published by a vehicle dealership to include a unique VIN number that corresponds to a specific vehicle currently in the dealership's inventory to which the offer may be applied. As the dealership sells off inventory, new offers may need to be generated or published for unsold vehicles to comply with these laws. Maintaining offers that track current inventory and manufacturer incentives may be difficult for many dealerships that often utilize manual offer generation techniques. In addition, some vehicle dealerships may not even be aware of these local laws or may be simply non-compliant with these laws in their offers due to the difficulty of constantly matching new offers to specific vehicles that are currently in inventory. In some cases, vehicle dealerships may also simply rely on an external agency to run these offers that may not have access to vehicle specific information on a real-time basis. In some cases, where a vehicle dealership generates offers on its own, the vehicle dealership may not have the required recourses, time, or skill set necessary to generate and publish offers in-house which is often a complex and time consuming process. This may be especially true when the target of the offer is a social media website such as, e.g., Facebook®, Twitter®, or other similar social media. The tool disclosed herein solves these problems by pulling together all of the data needed to generate an offer, guiding the vehicle dealership through the generation of the offer, and allowing the vehicle dealership to publish the offer to a target destination, e.g., social media, in real-time. In some aspects, the tool may also receive pre-designed and pre-approved offers from a manufacturer or other third party and allow the vehicle dealership to review, accept or modify, and publish the pre-designed and pre-approved offer to the target destination, e.g., social media.

Figure 1:
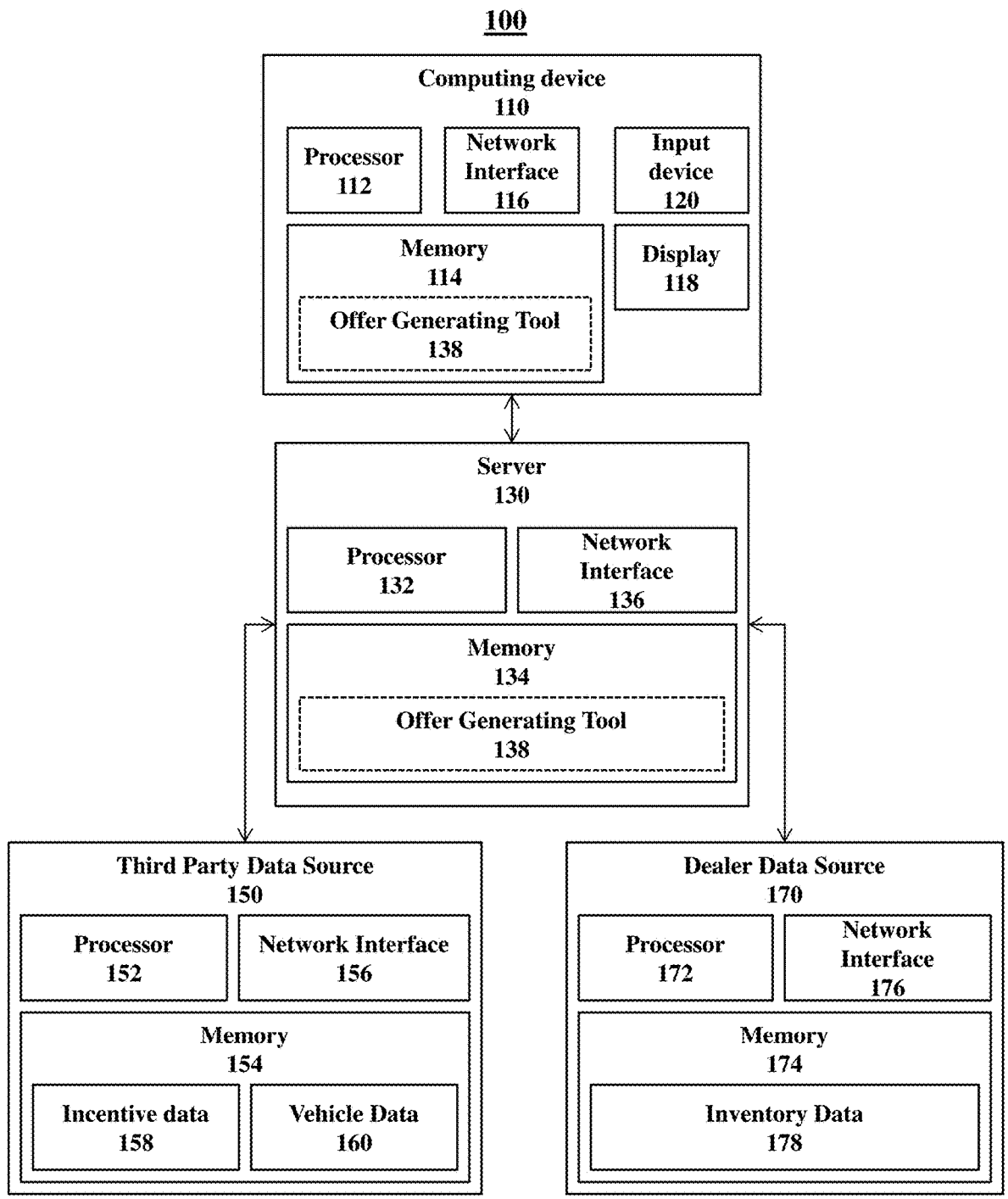
FIG. 1 is a system diagram illustrating a system for generating and publishing a vehicle offer to social media in accordance with an aspect of the present disclosure.

With reference now to FIG. 1, a system 100 for generating and publishing offers is illustrated. In some aspects, system 100 includes a computing device 110, a server 130, a data source 150 and a dealer data source 170.

Computing device 110 includes at least one processor 112, memory 114, at least one network interface 116, a display 118, an input device 120, and may include any other features commonly found in a computing device. In some aspects, computing device 110 may, for example, be a computing device associated with a user, e.g., a dealership, that is configured to present the user with a tool for generating and publishing offers. In some aspects, computing device 110 may include, for example, a personal computer, laptop, tablet, smart device, smart phone, smart watch, or any other similar computing device that may be used by a user.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from server 130 or any other computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from server 130. In some aspects, network interface 116 may be configured to transmit and receive data or information to and from data source 150 and dealer data source 170.

Display 118 may include any display device that is configured to display information to a user of computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a user. In some aspects, display 118 may include, for example, a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Server 130 includes a processor 132, memory 134, a network interface 136, and may include any other features commonly found in a computing device. Processor 132, memory 134, and network interface 136 may include similar functionality as processor 112, memory 114, and network interface 116. In some aspects, server 130 may, for example, be any computing device, server, or similar system that is configured to interact with or provide data to computing device 110. In some aspects, for example, server 130 may be a web server that is configured to host web data, web pages, web applications, or other similar content. In some aspects, for example, server 130 may be a backend server providing processing for an application executing on computing device 110.

In some aspects, for example, memory 134 may store instructions or software for executing an application such as offer generating tool 138. Offer generating tool 138 may be accessed by computing device 110 and may be configured to present a graphical user interface to a user of computing device 110 that is configured to allow the user to generate an offer. Offer generating tool 138 will be described in more detail below with reference to FIGS. 2-19.

Third party data source 150 includes a processor 152, memory 154, a network interface 156, and may include any other features commonly found in a computing device. Processor 152, memory 154, and network interface 156 may include similar functionality as processor 112, memory 114, and network interface 116. Third party data source 150 may be a computing device, server, database or other similar system, that stores data about manufacturer incentives and vehicles. In some aspects, the data stored on the third party data source 150 may be accessed via an application programming interface (API) associated with the third party data source 150. In some aspects, third party data source 150 may be managed by a third party. In some aspects, the third party data source 150 may be managed by a manufacturer. Third party data source 150 may store data about a single manufacturer, multiple manufacturers or any or data about any manufacturer, any vehicles, incentives, or other similar data. For example, in some aspects, memory 154 may store incentive data 158, e.g., data about current manufacturer incentives for vehicles produced by the manufacturer, and vehicle data 160, e.g., vehicle specifications, images, or other similar data about the vehicles produced by the manufacturer.

Incentive data 158 may include data or other information about incentives currently available from one or more manufacturers. Manufacturer incentives may include, for example, current deals, rebates, manufacturer's suggested retail price (MSRP) reductions, or other offers provided by a manufacturer of a vehicle. The manufacturer incentives may be applicable to any vehicles manufactured by a particular manufacturer, or to select vehicles or vehicle types manufactured by a manufacturer. In some aspects, some of the manufacturer incentives may be stackable such that they may be combined together. In some aspects, some of the manufacturer incentives may not be combined together. In some aspects, the stackability of a particular manufacturer incentive may be presented to the user by offer generating tool 138.

Vehicle data 160 may include stock data about each vehicle produced by one or more manufacturers. For example, vehicle data 160 may include images, specifications, MSRP or other similar data about vehicles that are produced by a manufacturer or another third party.

Dealer data source 170 includes a processor 172, memory 174, a network interface 176, and may include any other features commonly found in a computing device. Processor 172, memory 174, and network interface 176 may include similar functionality as processor 112, memory 114, and network interface 116. Dealer data source 170 may be a computing device, server, database or other similar system associated with a dealership that stores data about the dealership's inventory, incentives, and vehicles. In some aspects, for example, dealer data source 170 may store data about a dealership's current inventory, incentives, etc., in memory 174 as inventory data 178, e.g., in a database managed by the dealership.

In some aspects, dealer data source 170 may include a dealership's web site. In some aspects, offer generating tool 138 may scrape the dealership's web site, e.g., using a web scraping tool such as the web scraping tool Dexi.io™, to gather data about the dealerships current inventory. For example, if the dealership web site includes one or more pages that include current vehicle inventory information such as VIN numbers, vehicle models, trims, etc., those pages may be scraped to generate a list or database of the current inventory of the dealership that may be later accessed by offer generating tool 138 when generating an offer.

With continued reference to FIG. 1, aspects of offer generating tool 138 will now be described in more detail. In some aspects, offer generating tool 138 may be implemented or executed by server 130 as a web application, web site graphical user interface (GUI), or other similar mechanism for presenting a user with information and activatable elements for generating an offer. For example, a user of computing device 110 may log in or otherwise access server 130, e.g., using network interfaces 116 and 136, to utilize offer generating tool 138. Offer generating tool 138 may present the user with one or more graphical user interfaces, for example, via display 118 of computing device 110 that the user may utilize to generate and publish an offer, e.g., on social media.

In some aspects, offer generating tool 138 may be an application installed on computing device 110 that is configured to communicate with server 130 for back-end processing. For example, a user of computing device 110 may activate or execute the offer generating tool 138 on computing device 110, e.g., using input device 120, and offer generating tool 138 may present a graphical user interface to the user via display 118. As the user traverses the offer generating tool 138, computing device 110 may communicate with server 130 using network interfaces 116 and 136 to receive data or other information for generating offers from the server 130 and present the same to the user via display 118. For example, the data or other information may include incentive data 158, vehicle data 160, and inventory data 178 received by server 130 from third party data source 150 and dealer data source 170 via network interfaces 136, 156, and 176.

In some aspects, offer generating tool 138 may be an application installed on computing device 110 that is configured to communicate directly with third party data source 150 and dealer data source 170 with the processing being performed by processor 112 of computing device 110. For example, a user of computing device 110 may activate or execute the offer generating tool 138 on computing device 110, e.g., using input device 120, and offer generating tool 138 may present a graphical user interface to the user via display 118. As the user traverses the offer generating tool 138, computing device 110 may communicate with third party data source 150 and dealer data source 170 using network interfaces 116, 156, and 176 to receive data or other information for generating offers and present the same to the user via display 118. For example, the data or other information may include incentive data 158, vehicle data 160, and inventory data 178 received by computing device 110 from third party data source 150 and dealer data source 170 via network interfaces 116, 156, and 176.

With reference now to FIGS. 2-19, an example graphical user interface (GUI) 202 that may be presented by offer generating tool 138 (FIG. 1) will now be described.

Figure 2:
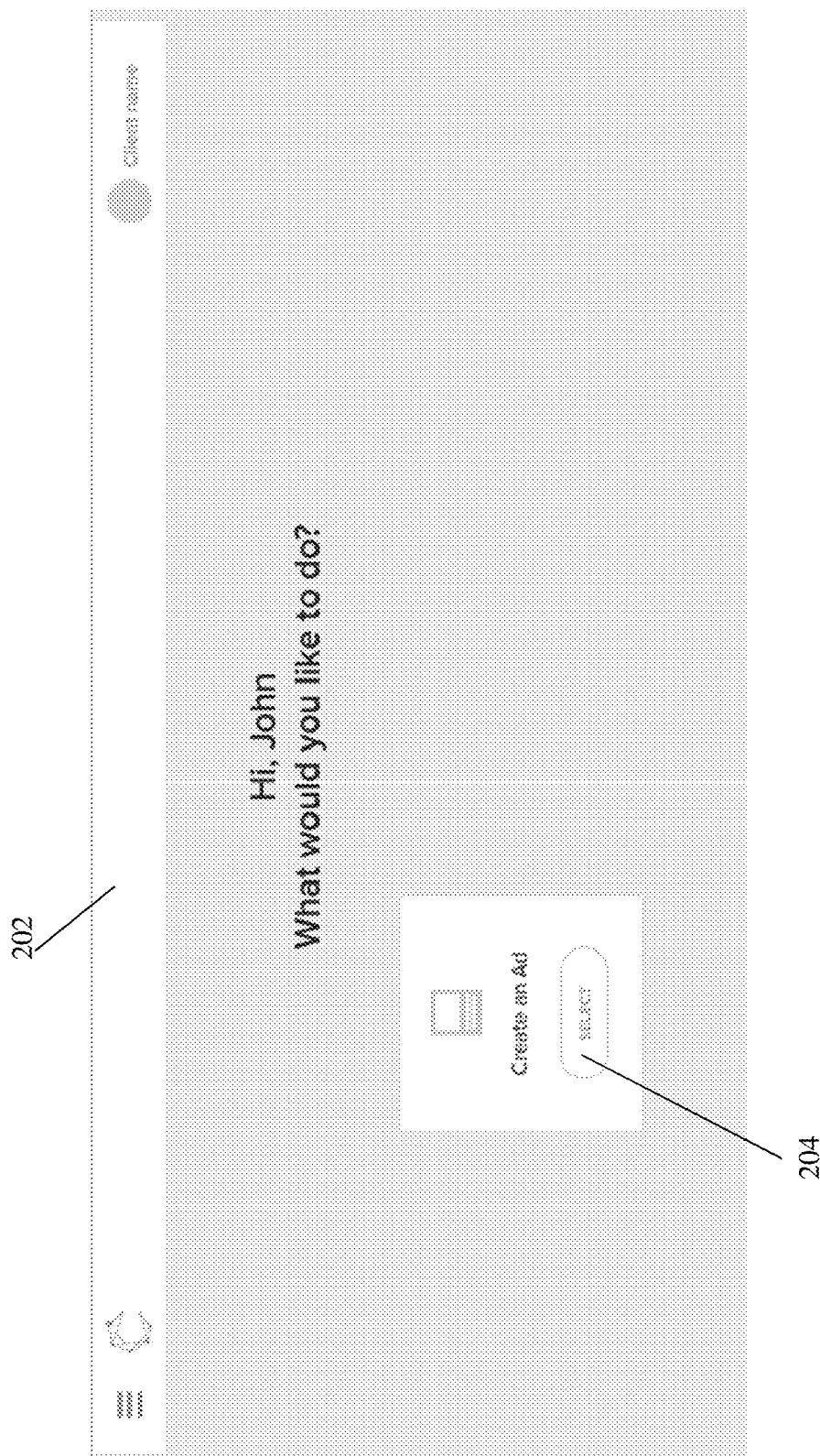

With reference to FIG. 2, GUI 202 may present a user of computing device 110 with a create an ad element 204 that is activatable by the user, e.g., using input device 120, to begin the process of generating an offer.

Figure 3:
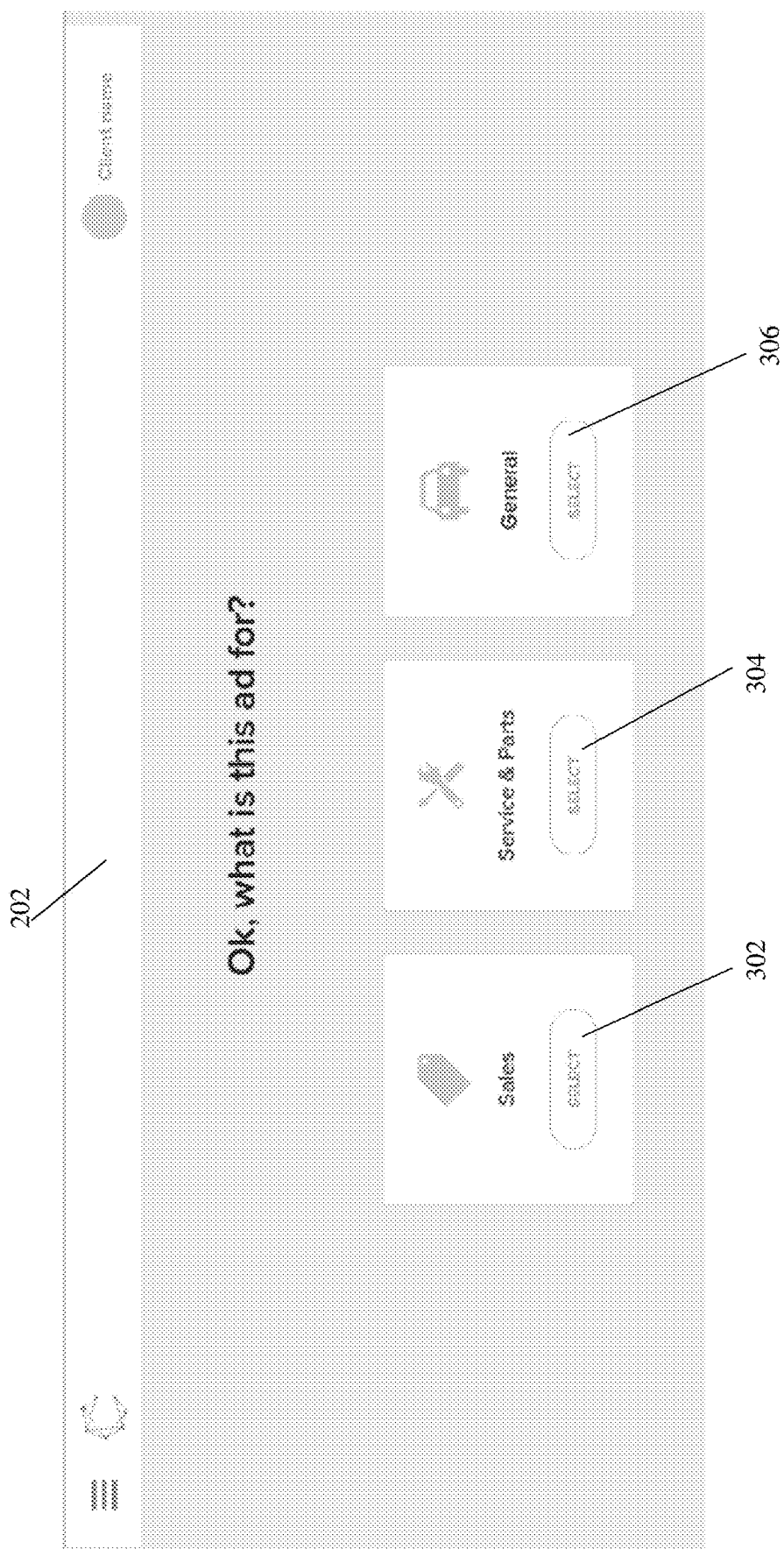

With reference now to FIG. 3, in response to a user activation of the create an ad element 204, GUI 202 presents the user of computing device 110 with options for generating an offer. As illustrated in FIG. 3, for example, GUI 202 may present the user with a sales element 302, a service and parts element 304, and a general element 306. Sales element 302 may be activatable by the user, e.g., using input device 120, to generate an offer for the sale of a vehicle, service and parts element 304 may be activated by the user, e.g., using input device 120, to generate an offer for the sale of services or parts, e.g., an oil change, tire rotation or replacement, brakes, or other similar services or parts, and general element 306 may be activated by the user, e.g., using input device 120, to generate any other kind of offer. In some aspects, for example, the general element 306 may allow a user to define a custom offer for any product or service.

Figure 4:
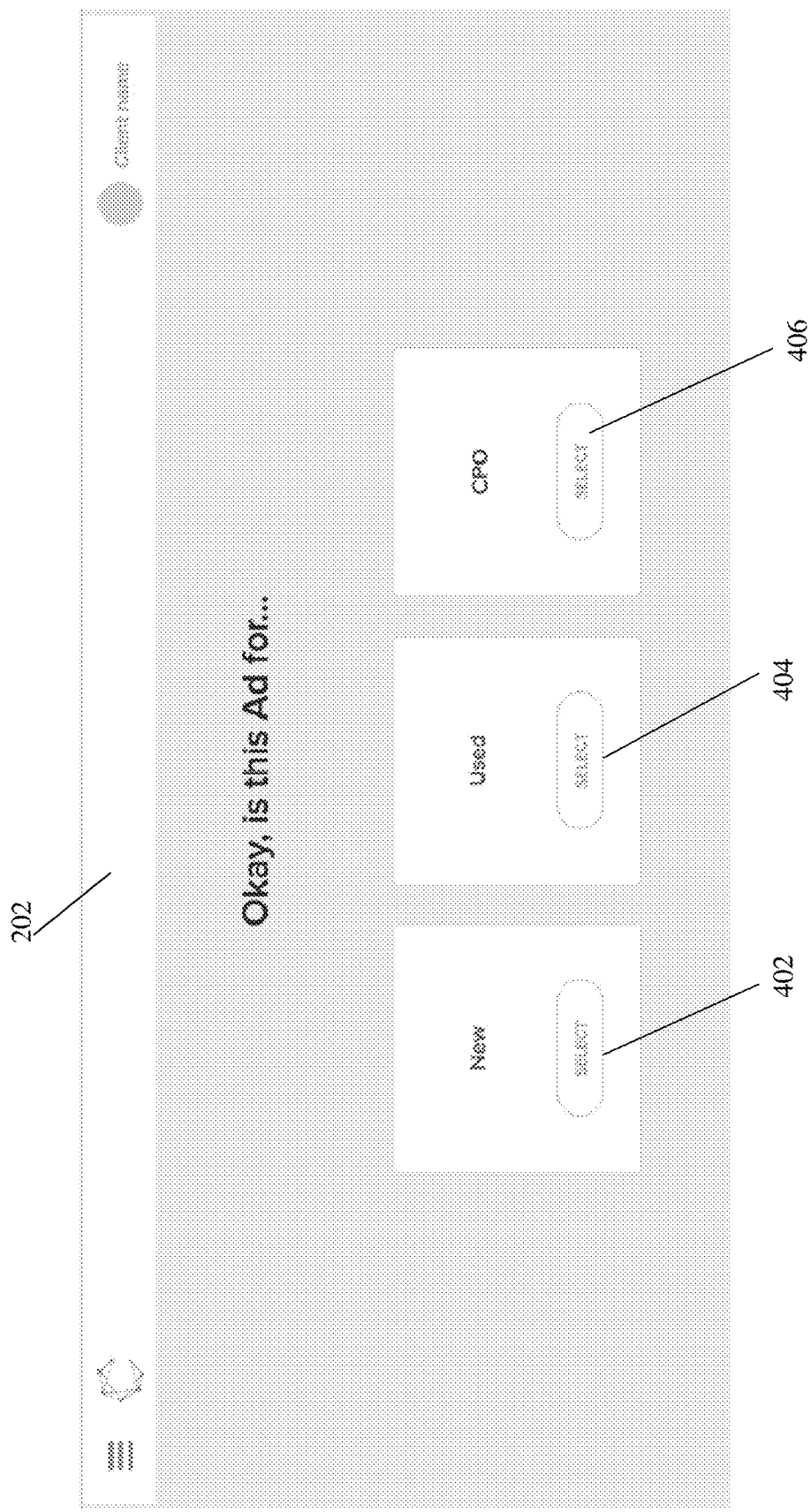

With reference to FIG. 4, in response to a user activation of sales element 302, GUI 202 presents a user of computing device 110 with options for defining a purpose of the offer. As illustrated in FIG. 4, for example, GUI 202 may present the user with a new element 402, a used element 404, and certified pre-owned (CPO) element 406. New element 402 may be activatable by the user, e.g., using input device 120, to generate an offer for the sale of a new vehicle, used element 404 may be activated by the user to generate an offer for the sale of a used vehicle, and CPO element 406 may be activated by the user to generate an offer for the sale of a certified pre-owned vehicle.

Figure 5:
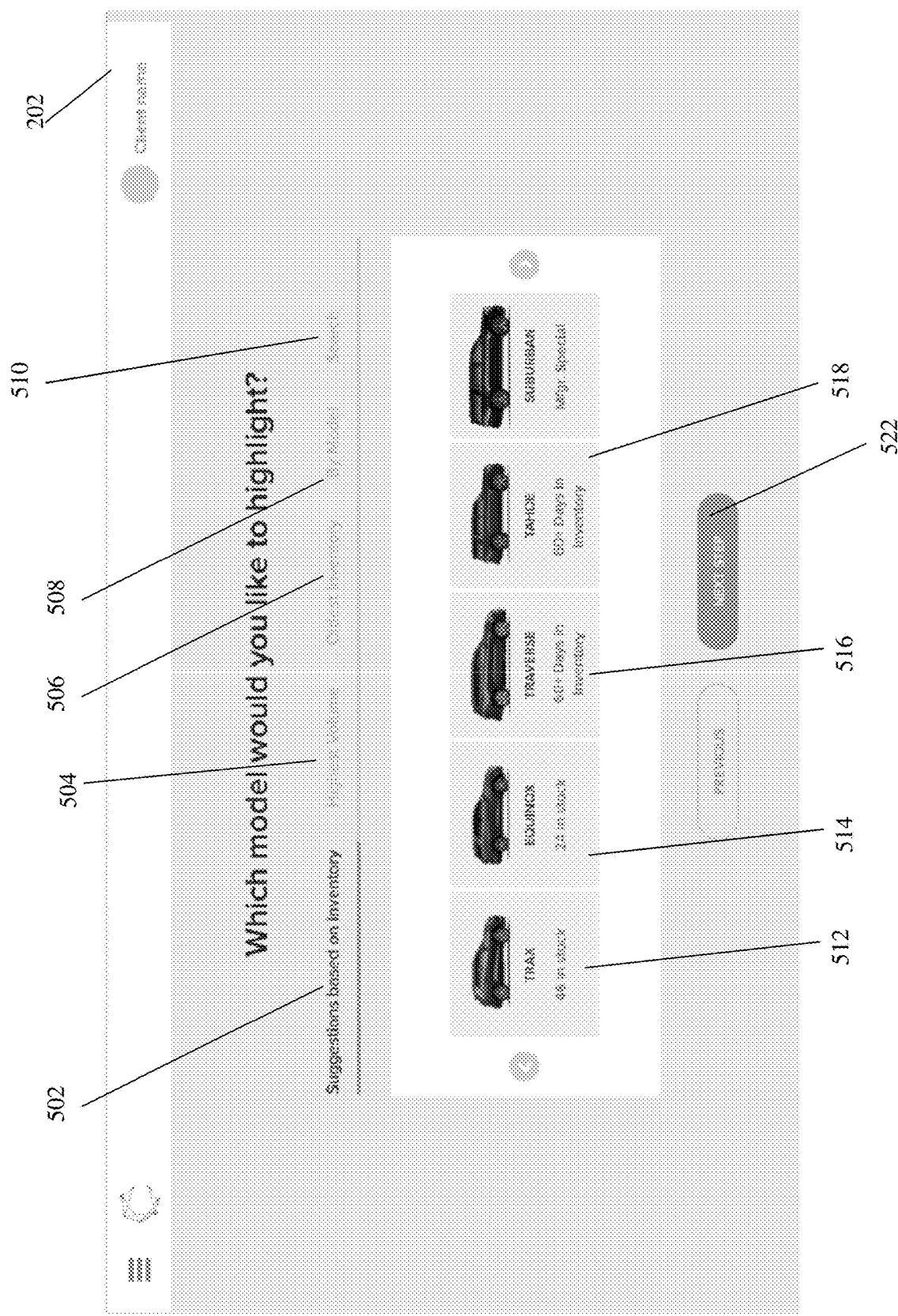

With reference to FIG. 5, in response to a user activation of new element 402, GUI 202 presents a user of computing device 110 with options for selecting a particular model of vehicle for the offer. As illustrated in FIG. 5, for example, GUI 202 may present the user with categories 502, 504, 506, 508, and 510 that are activatable by the user, e.g., via input device 120, to filter or modify the vehicles or vehicle models that are available for selection by the user. In some aspects, for example, offer generating tool 138 may retrieve or receive inventory data 178 from the dealer data source 170 and categories 502, 504, 506, 508, and 510 may be used to filter the inventory data 178 for presentation to the user.

For example, the activation of category 502 may cause GUI 202 to present the user with vehicle models based on an inventory status of the vehicle models. For example, as illustrated in FIG. 5, the activation of category 502 may cause GUI 202 to present vehicle models 512 and 514 which include a large number of vehicles in stock, e.g., 46 vehicles, 24 vehicles, or any other number of vehicles in stock, vehicle models 516 and 518 which include vehicles that have been in inventory for a long period of time, e.g., more than 60 days as illustrated in FIG. 5 or any other period of time, etc. In some aspects, category 502 may also present a vehicle model 520 that has a manufacturer's special, e.g., based on incentive data 158 retrieved or received from third party data source 150, e.g., via network interfaces 136 and 156. In some aspects, images or other vehicle data 160 may be retrieved or received from third party data source 150, e.g., via network interfaces 136 and 156, for presentation in GUI 202. In some aspects, for example, the user may activate one or more of the presented vehicle models 512, 514, 516, 518, and 520 and may activate the next step element 522 to proceed with generating an offer for the selected vehicle model(s).

Figure 6:
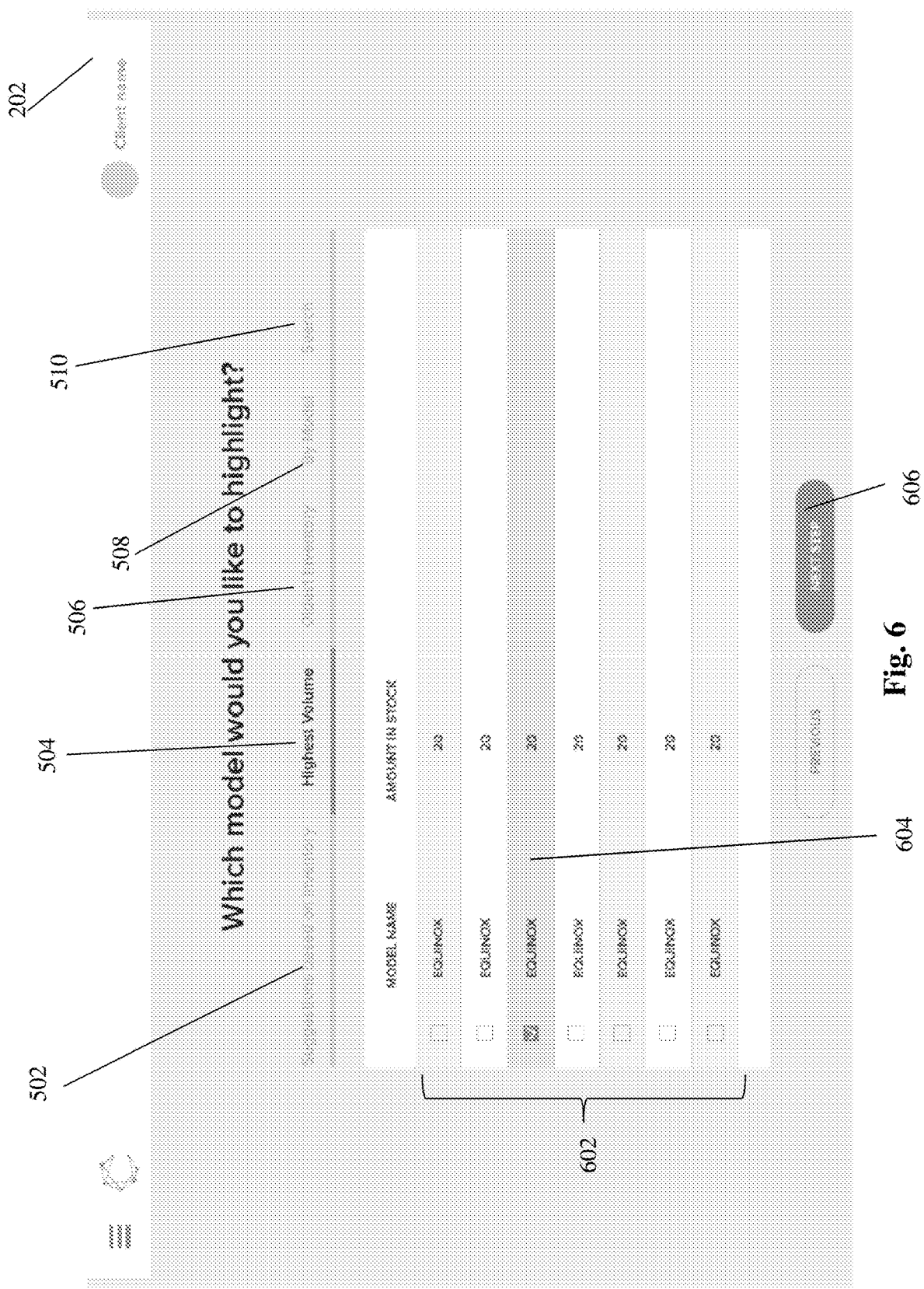

With reference now to FIG. 6, for example, activation of category 504 may cause GUI 202 to present the user with a list 602 of vehicle models that have the highest inventory. For example, a vehicle model 604 having 20 vehicles in stock may be presented. The number of vehicles of each vehicle model that are currently in the dealership's stock may be received or retrieved by offer generating tool 138 from dealer data source 170, e.g., via network interfaces 136 and 176. In some aspects, the user may activate one or more of the listed vehicle models, e.g., vehicle model 604, and may activate the next step element 606 to proceed with generating an offer for the selected vehicle model(s).

Figure 7:
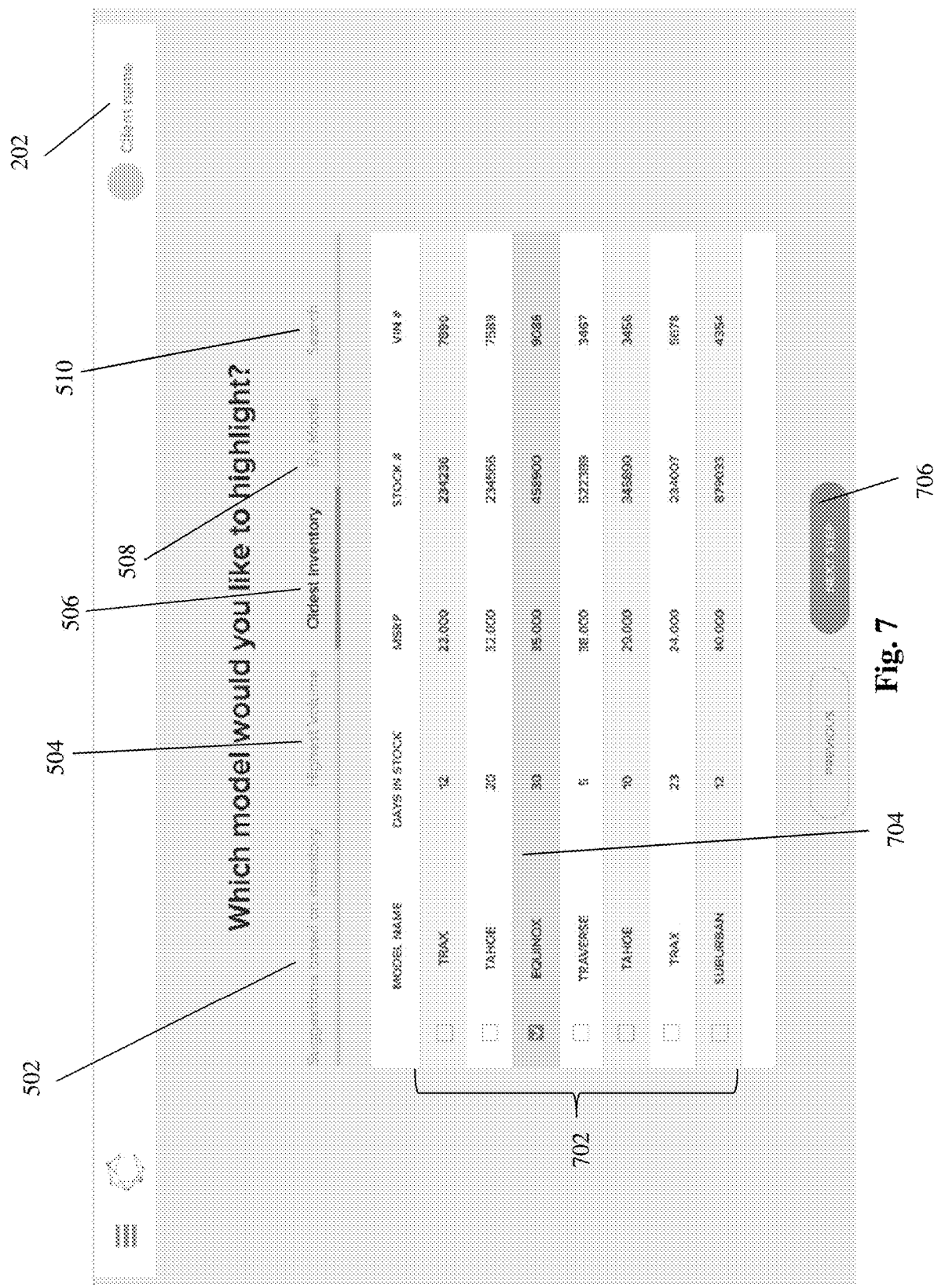

With reference now to FIG. 7, for example, activation of category 506 may cause GUI 202 to present the user with a list 702 of vehicles that have been in stock the longest, i.e., the oldest vehicles in inventory. For example, a vehicle 704 having 30 in stock may be presented. In some aspects, the user may activate one or more of the listed vehicle, e.g., vehicle 704, and may activate the next step element 706 to proceed with generating an offer for the selected vehicle(s).

Figure 8:
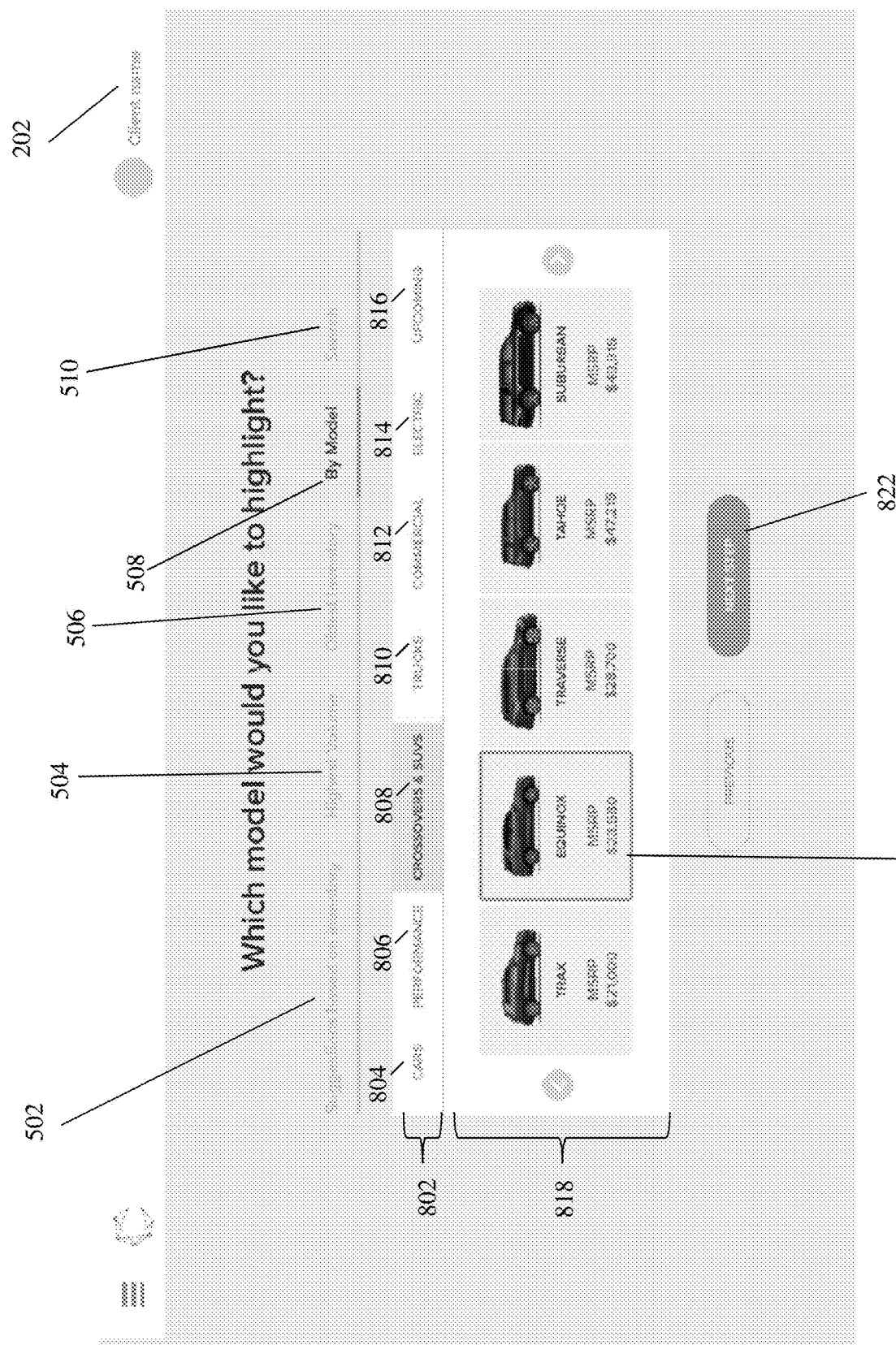

With reference now to FIG. 8, for example, activation of category 508 may cause GUI 202 to present the user with a list 802 of vehicle model categories, e.g., cars category 804, performance category 806, crossover & suvs category 808, trucks category 810, commercial category 812, electric category 814, and upcoming category 816. In response to a user activation of any of categories 804-816, for example, crossover & suvs category 808, offer generating tool 138 may cause GUI 202 to present the user with a list of vehicles 818 of the activated category. In some aspects, the user may activate one or more of the listed vehicles, e.g., a vehicle 820, and may activate the next step element 822 to proceed with generating an offer for the selected vehicle(s).

Figure 9:
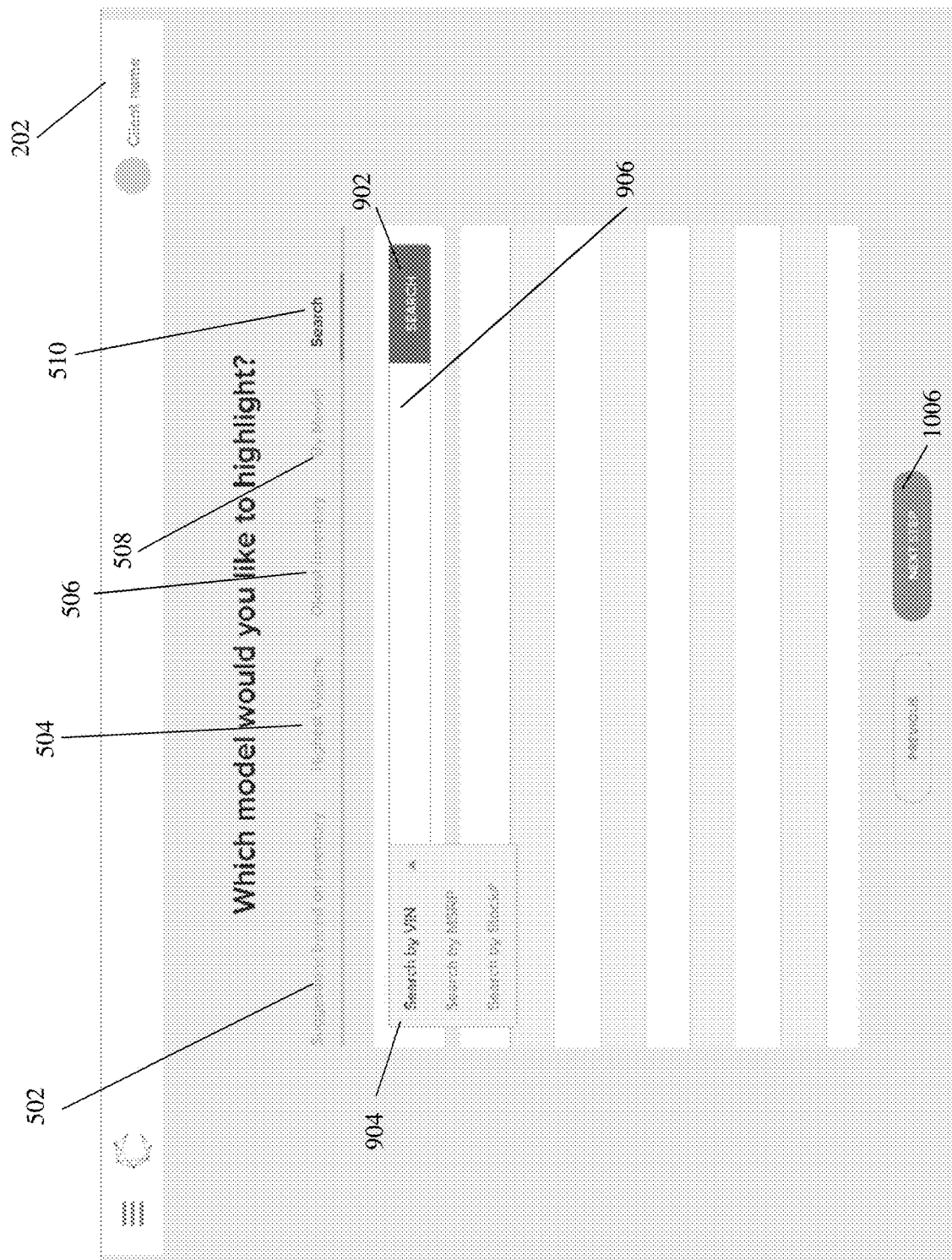
Figure 10:
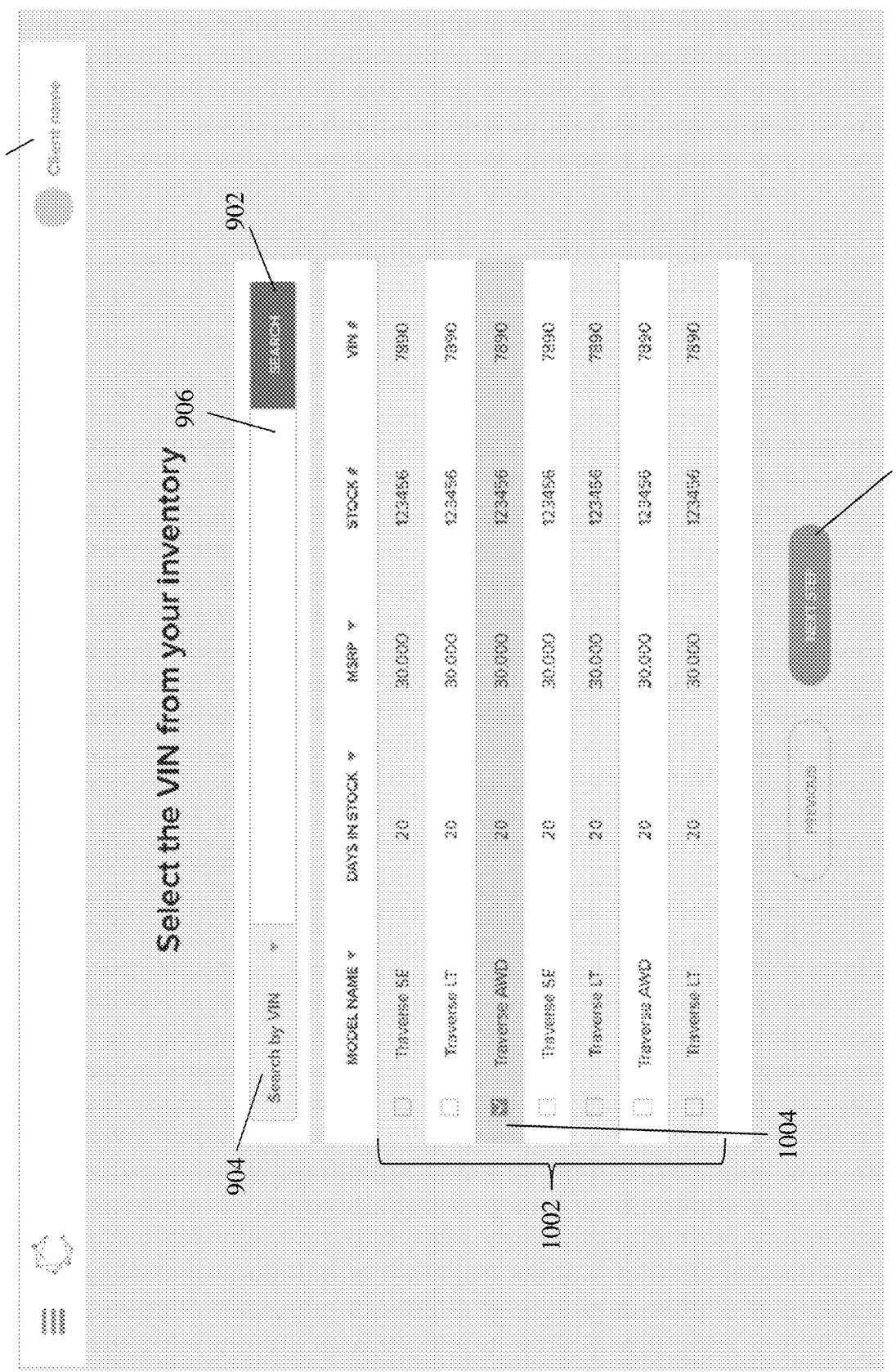

With reference now to FIGS. 9 and 10, for example, activation of category 510 may cause GUI 202 to present the user with a textual search field 902 that may be used by the user to search for vehicles. For example, the user may activate an element 904 to select a type of search, e.g., by VIN number, MSRP, stock amount, etc. The user may then input a search term, value, etc., in search box 906 to search for a vehicle. A list of vehicles 1002 may be presented to the user in response to the search as illustrated, for example, in FIG. 10. In some aspects, the user may activate one or more of the listed vehicle, e.g., vehicle 1004, and may activate the next step element 1006 to proceed with generating an offer for the selected vehicle(s).

Figure 11:
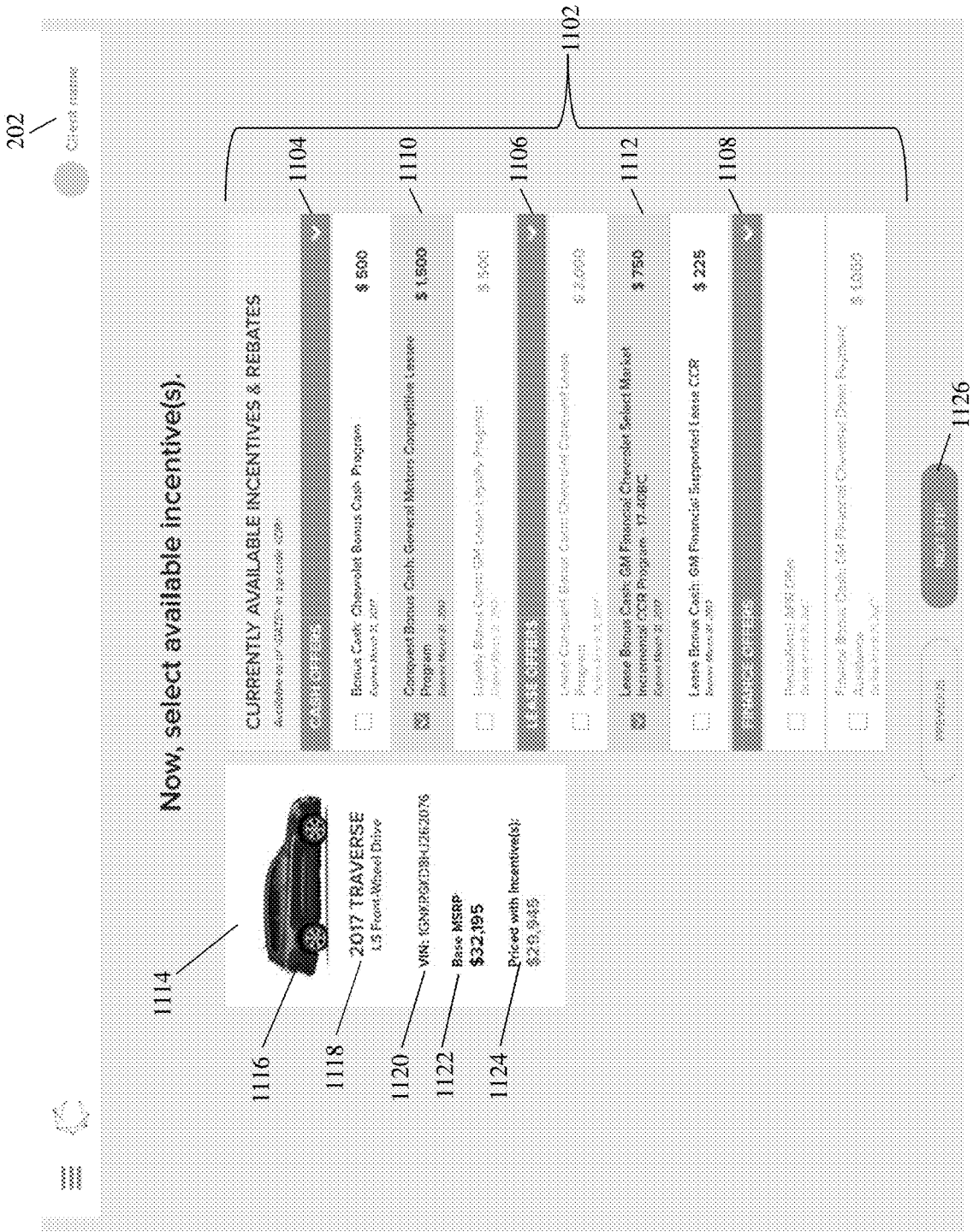

With reference now to FIG. 11, in response to the activation of one of next step elements 514, 606, 706, 822, and 1006 (FIGS. 5-8 and 10), offer generating tool 138 may cause GUI 202 to present the user with a list of currently available incentives 1102 for the selected vehicle or vehicle model 1104. In some aspects, for example, incentives 1102 may be retrieved or received from third party data source 150 by offer generating tool 138, e.g., via one or more of network interfaces 116, 136, and 156. Incentives 1102 may include, for example, a cash offers category 1104, a lease offers category 1106, a finance offers category 1108, or any other category of incentives. For example, the user may activate or select, e.g., using input device 120, an incentive 1110 that provides bonus cash, e.g., $1,500, for a conquest lease the under cash offers category 1104. In some aspects, for example, the user may activate or select, e.g., using input device 120, an incentive 1112 that provides bonus cash, e.g., $750, for using a preferred lender under lease offers category 1106. In some aspects, each incentive may include an expiration date.

In some aspects, for example, information or data about the selected vehicle or vehicle model 1114 may be presented including, e.g., an image 1116, model name 1118, vehicle identification number (VIN) 1120, base MSRP 1122, MSRP with selected incentives 1124, or other similar information. In some aspects, for example, the information or data about the selected vehicle may be received from third party data source 150 and dealership data source 170. For example, in some aspects, the image 1116, the model name 1118, and the base MSRP 1122 may be retrieved or received from third party data source 150. In some aspects, the VIN 1120 may be retrieved or received from dealer data source 170 since the VIN identifies a specific vehicle currently in the dealership's inventory.

In some aspects, the MSRP with selected incentives 1124 may be dynamically updated as the user selects or activates various incentives from categories 1104, 1106, and 1108. For example, the base MSRP 1122, e.g., $32,195 may be updated based on the selected incentives 1110 and 1112, e.g., by $2,250, to achieve the MSRP with selected incentives 1124, e.g., $29,945.

In some aspects, once the user is satisfied with the selected incentives, the user may activate next step element 1126 to proceed with generating an offer.

Figure 12:
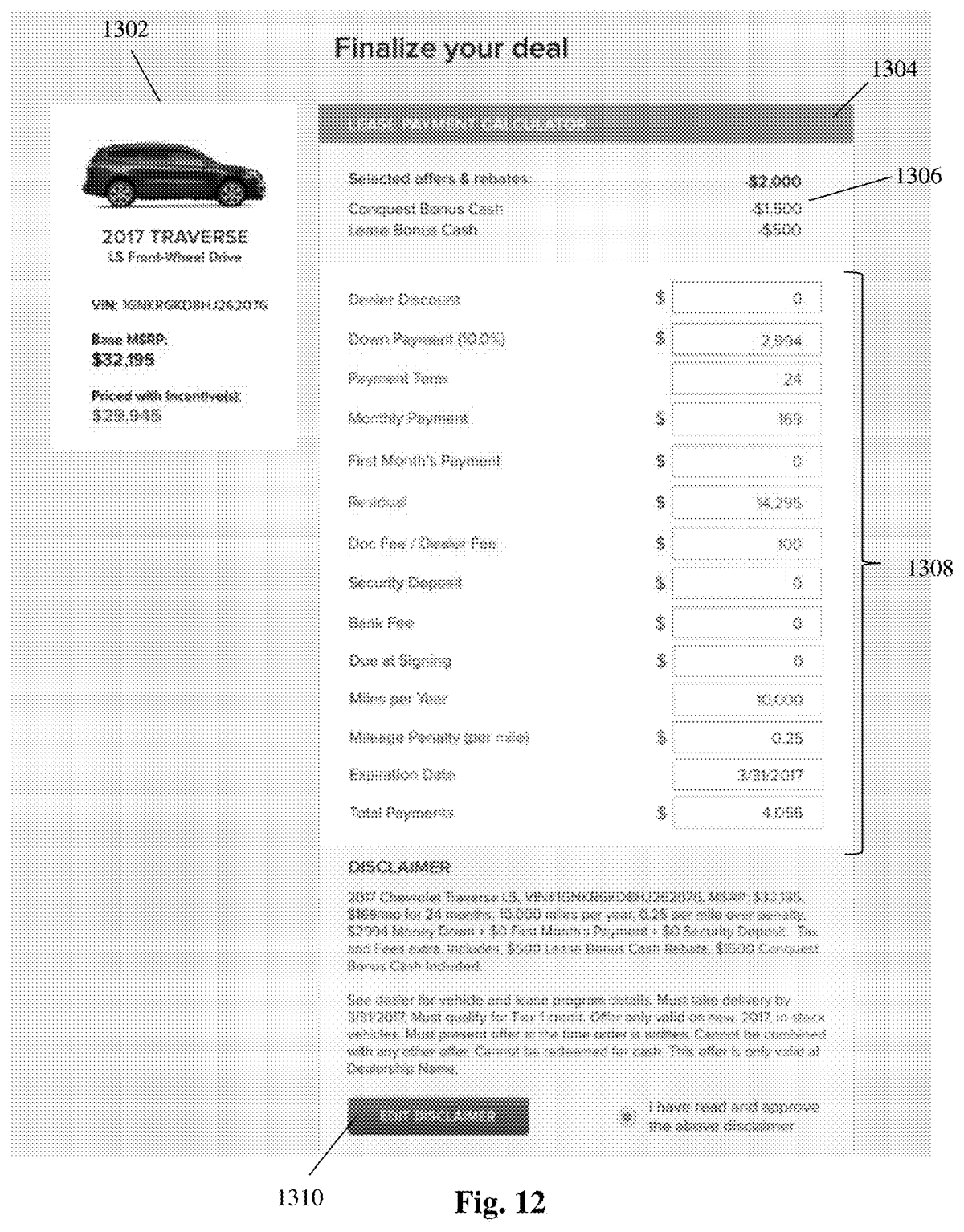

With reference now to FIG. 12, in some aspects, offer generating tool 138 may cause GUI 202 to present the user with an opportunity to create an offer based on the selected incentives. For example, the vehicle model, VIN, base MSRP and MSRP with incentives may be presented in an interface 1302 and additional information on the offer may be presented in an offer creation interface 1304. Offer creation interface 1304 may include, for example, a summary of selected incentives 1306 and a number of user input fields 1308 including, e.g., dealer discount, down payment, payment term, monthly payment, first month's payment residual, doc fee and dealer fee, security deposit, bank fee, amount due at signing, miles per year, mileage penalty (per mile), expiration date, and total payments. In some aspects, some or all of fields 1308 may be automatically populated based on the selected payment terms or options. In some aspects, the user may modify any of fields 1308 by activating the field with input device 120. In some aspects, the modification of one of fields 1308 may automatically adjust the value presented in one or more of the other fields 1308. In some aspects, the user may also edit the disclaimer language to be used in the offer, for example, by activating the edit disclaimer element 1310, e.g., using input device 120.

Figure 13:
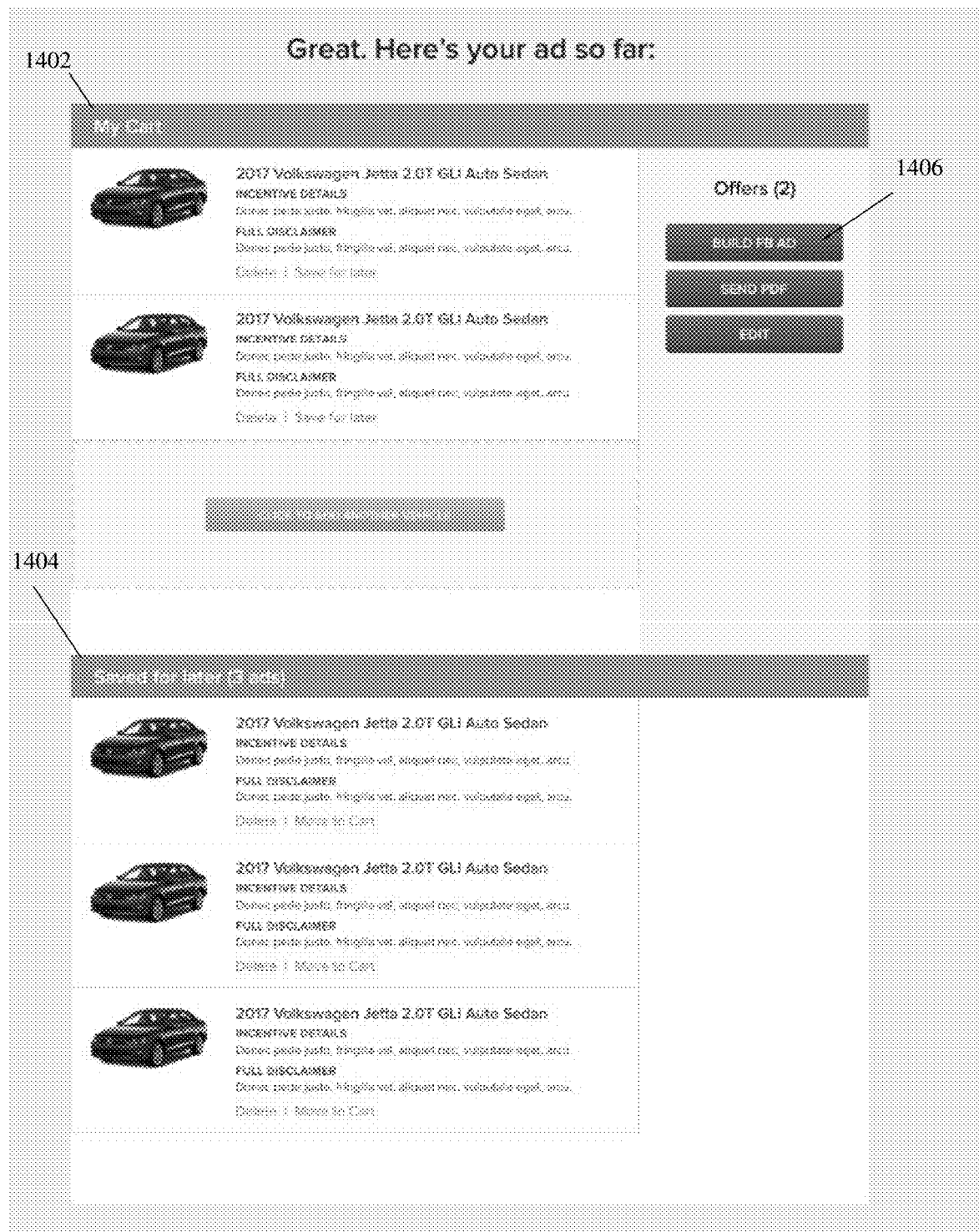

With reference now to FIG. 13, once the user has approved or finalized one or more offers, offer generating tool 138 may cause GUI 202 to present the user with list 1402 of offers to be published, e.g., in a cart, and a list 1404 of offers that are saved for later. The user may move offers between list 1402 and list 1404 by activating "save for later" and "move to cart elements," respectively. In some aspects, the user may activate an element 1406, e.g., using input device 120, to generate an offer publication for a selected offer (or each offer currently in the cart).

Figure 14:
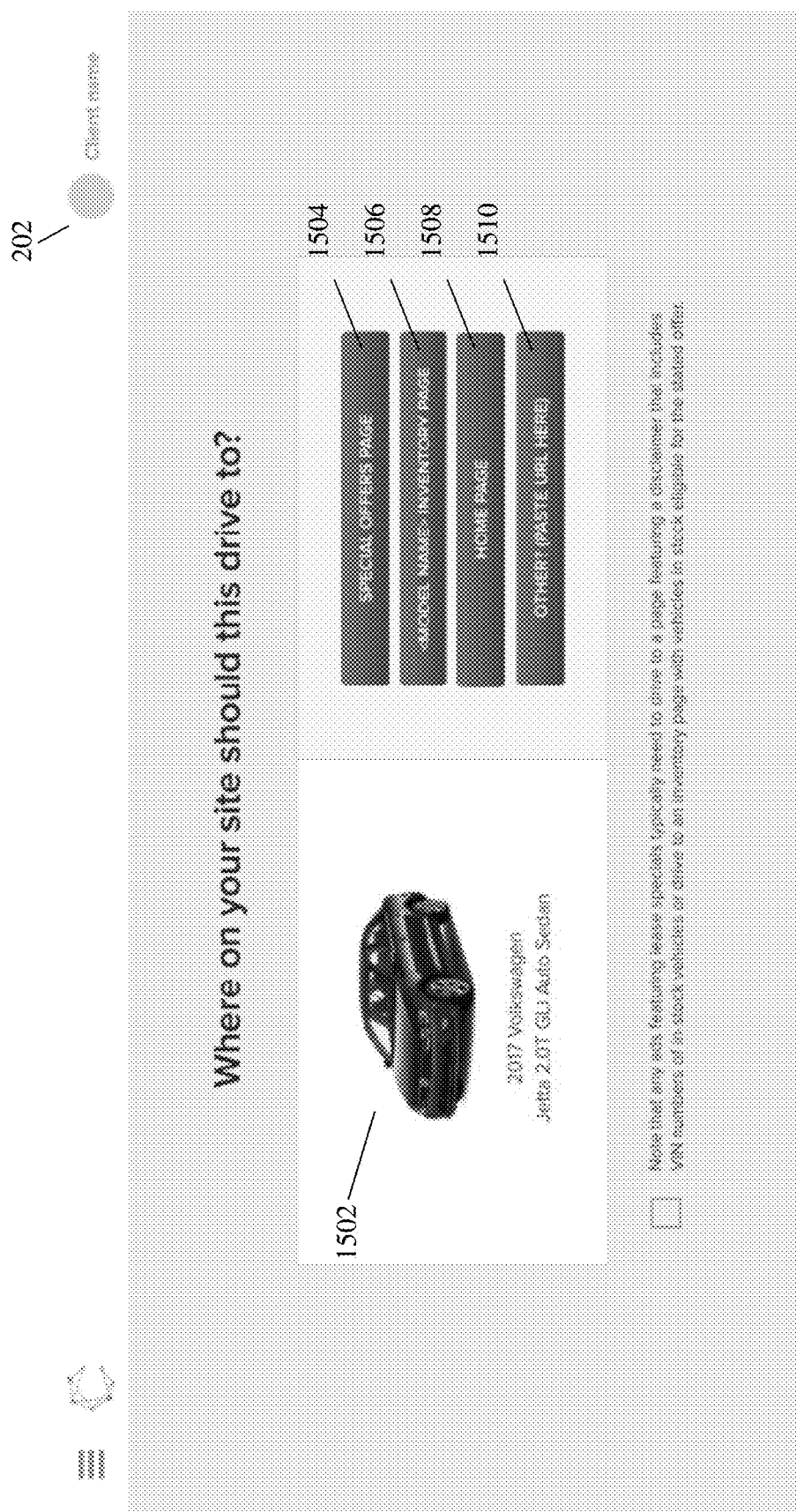

With reference now to FIG. 14, in response to the activation of element 1406, offer generating tool 138 may cause GUI 202 to present an interface for selecting what target location on the dealership's web site or system the offer publication should drive to. For example, the interface may include a presentation of the vehicle model information 1502, e.g., image, model year, name, etc., and target elements 1504, 1506, 1508, and 1510 that are activatable by the user, e.g., using input device 120, to select a target destination that the offer publication will drive to when a potential customer activates the offer publication. For example, activation of target element 1504 may set the offer publication to drive to a special offers page of the dealership's web site, activation of target element 1506 may set the offer publication to drive to an inventory page of the dealership for the selected vehicle model, activation of target element 1508 may set the offer publication to drive to the home page of the dealership, and activation of target element 1510 may allow the user to input a custom destination for the offer publication, e.g., the user may input a web link or other similar destination information using input device 120.

Figure 15:
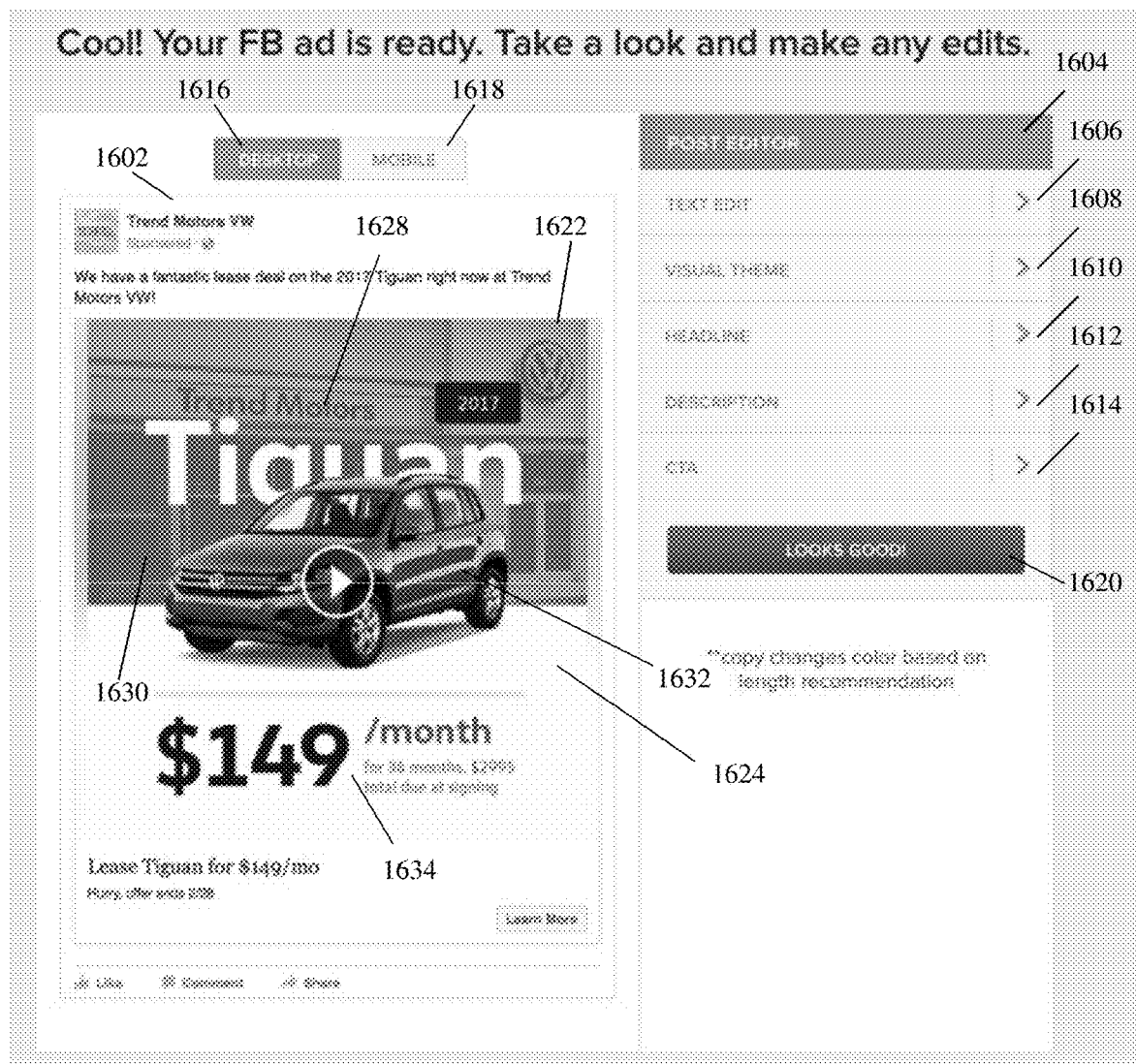

With reference now to FIG. 15, in response to the activation of one of target elements 1504, 1506, 1508, or 1510, offer generating tool 138 may cause GUI 202 to present the user with an offer publication 1602 and a post editor interface 1604 for editing the offer publication 1602.

In some aspects, for example, the offer publication 1602 may be generated by integrating the incentive data 158 and vehicle data 160 received from third party data source 150 with the inventory data 178 received from dealer data source 170 and the selections made by the user as described above. For example, the offer publication 1602 may be generated based on images of the selected vehicle model retrieved from vehicle data 160, incentive information retrieved from incentive data 158, dealership specific vehicle data such as specific VINs retrieved from inventory data 178 and the selections made by the user as described above with reference to FIGS. 5-14.

In some aspects, the offer publication 1602 may be automatically generated, e.g., using an offer publication algorithm, machine learning, or other similar automated systems. For example, in some aspects, offer generating tool 138 may generate the offer publication 1602 based on the received and selected information or data, e.g., incentive data 158, vehicle data 160, inventory data 178, and selections made by the user by determining the best configuration to present the offer.

In some aspects, for example, offer publication 1602 may be generated based on one or more offer templates that may be stored in memory 134. For example, the positioning of images in the offer publication 1602, e.g., the position of the vehicle, background, offer language, disclaimers, or other similar information may be pre-determined based on one or more templates. In some aspects, offer generating tool 138 may automatically select a template for use in generating the offer publication 1602. For example, in some aspects, offer generating tool 138 may select a default template for use in generating the offer publication 1602. In some aspects, the user may also or alternatively be presented with one or more offer templates to select from for use in the offer publication 1602. For example, the user may select between templates having different color schemes, layouts, text location, or any other features of the offer.

In some aspects, the templates may be pre-generated, for example by a user or administrator of offer generating tool 138. In some aspects, a user of a dealership may generate one or more templates for later use and store them in memory 134 or memory 114.

Figure 16:
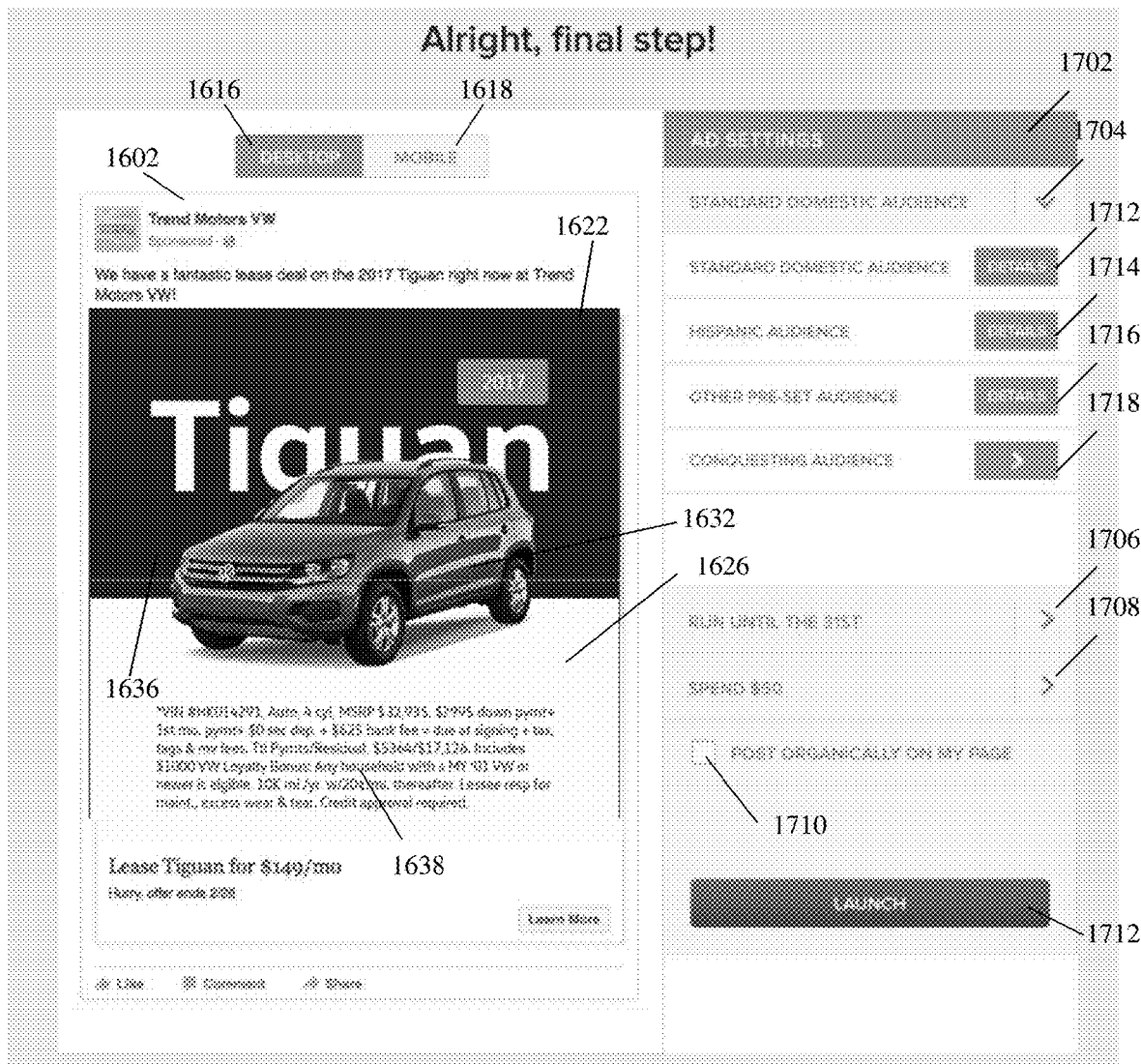

With reference now to FIGS. 15 and 16, in some aspects, offer publication 1602 may include a video or slideshow 1622. For example, as illustrated in FIG. 15, the slideshow 1622 of offer publication 1602 may present a frame 1624. Slideshow 1622 of offer publication 1602 may be configured to transition from frame 1624 to a frame 1626, for example, as illustrated in FIG. 16, after a pre-determined amount of time, e.g., 2 seconds, after a user activation or input, or in any other manner. In some aspects, slideshow 1622 may further transition from frame 1626 to any number of other frames or to return from frame 1626 to frame 1624. In some aspects, slideshow 1622 may cycle between frame 1624, frame 1626, and any other frames on a continuous loop. In some aspects, when offer publication 1602 is published, e.g., to social media, offer publication 1602 may automatically transition between frames 1624, 1626, and any other frames of the slideshow 1622 to present the offer to potential customers.

In some aspects, for example, slideshow 1622 may be generated based on pre-defined criteria found in the templates. For example, a slideshow template for a single vehicle offer may include a number of frames related to presenting the vehicle without pricing, pricing, disclaimers, slogans, and a closing frame. A multi vehicle offer template may include the same information for more than one vehicle offer where, for example, slideshow 1622 transitions from frames about one vehicle offer to frames about another vehicle offer. For example, slideshow 1622 may present four or five frames about the first vehicle, followed by four or five frames about the second vehicle, followed by four or five frames about the third vehicle, etc. Once the final frame is shown, in some aspects, slideshow 1622 may return to the first frame about the first vehicle and continue through the slide show one or more additional times.

An example slideshow 1622 will now be described.

In some aspects, for example, an initial frame of slideshow 1622 may include an image of the dealership, e.g., a logo or other image that may be uploaded to offer generating tool 138 by a user of the dealership, an overlay color, e.g., blue, red, white, black, or any other color with how much of the frame the color will overlay, and an image of a vehicle, e.g., retrieved from vehicle data 160. In some aspects, for example, the initial frame may not include any pricing information.

In some aspects, the slideshow 1622 may transition from the initial frame to frame 1624, e.g., as illustrated in FIG. 15, which also includes an image 1628 of the dealership, overlay color 1630, e.g., ½ blue, an image 1632 of a vehicle, and pricing information 1634, e.g., based on selected incentives and pricing information input by the user. The location and format of content of the offer in each frame, e.g., the image 1628, overlay color 1630, image 1632, and pricing information 1634, may be based on the selected template or may be automatically determined based on the content included in the offer for that frame.

In some aspects, the slideshow 1622 may transition from the frame 1624 to frame 1626, e.g., as illustrated in FIG. 16, which also includes an overlay color 1636, e.g., ½ black, the image 1632 of the vehicle, and terms information 1638, e.g., based on selected incentives and terms information input by the user. The location and format of content of the offer in each frame, e.g., overlay color 1636, image 1632, and pricing information 1638, may be based on the selected template or may be automatically determined based on the content included in the offer for that frame.

In some aspects, the slideshow 1622 may transition from frame 1626 to another frame for presenting a disclaimer that includes an overlay color, e.g., ½ grey, a text disclaimer, and the image 1632 of the vehicle.

In some aspects, the slideshow 1622 may further transition to another frame for presenting a slogan that may include an overlay color, e.g., full grey, a statement or slogan, e.g., "Catch it while you can!", and an expiration date for the offer.

In some aspects, the slideshow 1622 may further transition to a final or closing frame that includes an overlay color, e.g., full grey, and a dealer logo.

While described as examples, any frame from slideshow 1622 may include any content described herein including, without limitation, an image of a dealership, image of a vehicle, pricing information, an overlay color, terms information, a slogan, an expiration date, or any other information. Slideshow 1622 is not limited to the frames described above and may include any number of any type of frame without departing from the scope of the present disclosure.

In addition, the order of frames described above is non-limiting and the frames may be ordered within the slideshow 1622 in any other manner.

With continued reference to FIG. 15, in some aspects, the user may edit the offer publication 1602 using a post editor interface 1604. For example, the user may edit the text of the offer publication 1604 by activating a text edit element 1606, a visual theme of the offer publication 1604 by activating a visual theme element 1608, a headline of the offer publication 1604 by activating a headline element 1610, a description of the offer publication 1604 by activating a description element 1612, and a call to action (CTA) for the offer publication 1604 by activating a CTA element 1614.

In some aspects, any changes or modifications made to the offer publication 1604 may be stored, e.g., in memory 134 or memory 114, as a template for future use by the user. In some aspects, the changes or modifications may be stored as a template for later use by other users of offer generating tool 138. In some aspects, any changes made by the user may be fed into a machine learning system as training data that may be used to modify the behavior of the machine learning system such that the machine learning system, in response to a new offer having similar incentive data 158, vehicle data 160, inventory data 178 or selections made by the user, may output a similar offer publication to the modified offer publication.

In some aspects, the user may activate a desktop element 1616 or a mobile element 1618 to review the offer publication 1602 as it will be presented to each type of device. For example, selection of mobile element 1618 may present a version of offer publication 1602 that is configured for presentation on mobile devices, e.g., smart phones, smart watches, tablets, etc., that typically have smaller screens as compared to displays used by desktop and laptop computing devices.

Once the user is finished reviewing and modifying the offer publication 1602, the user may activate a looks good element 1620 to accept the offer publication 1602 and proceed to the next step.

With reference now to FIG. 16, in response to activation of the looks good element 1620, offer generating tool 138 may cause GUI 220 to present the user with the offer publication 1602 and an offer settings interface 1702 that defines the targets for the offer publication. For example offer settings interface 1702 may include an audience element 1704, a date element 1706, a paid offer element 1708, and a post organically element 1710.

In some aspects, for example, audience element 1704 allows the user to define a target audience for the offer publication 1602. For example, activation of audience element 1704 may present the user with a list of potential audiences including, but not limited to, a standard domestic, foreign, or highline audience 1712, a Hispanic audience 1714, other pre-set audiences 1716, e.g., pre-defined by the dealership, by other users, administrators, etc., and conquesting audiences 1718, e.g., owners of cars sold by other manufacturers that are in the same or similar price range or class. In some aspects, for example, selection of any of the potential audience groups may present the user with more information about the selected audience group including, for example, a size of the selected audience, locations of members of the selected audience group, an age range of the selected audience group, conquesting brands owned by potential consumers who match the selected audience group, etc. Any other audience groups may also be targeted within audience element 1704 without departing from the scope of the present disclosure.

In some aspects, for example, date element 1706 allows the user to specify an ending date for the offer, e.g., the last day that the offer will be presented to the public. In some aspects, the available ending dates may be limited by the expiration date of any incentives included in the offer. For example, if an incentive that is included in the offer ends on the 15$^{th}$ of the month, date element 1706 may only allow the user to specify the 15$^{th}$ or earlier as the end date for the offer.

In some aspects, for example, paid offer element 1708 allows the user to purchase paid advertising space in a target medium, e.g., on social media such as Facebook®, web pages, etc. For example, in some aspects, if the user does not wish to purchase paid advertising, the offer publication 1602 may be presented as a post or social media publication rather than as an advertisement.

In some aspects, for example, post organically element 1710, e.g., a checkbox, may be activated by the user to enable posting of the offer publication 1602 to a page or other communication outlet of the dealership when the offer publication 1602 is launched. For example, the dealership may have a web page or account on a social media site such as, e.g., Facebook®, Twitter®, Instagram®, or other similar social media outlets to which the offer publication 1602 may be posted.

In some aspects, once the user has configured the offer settings in the offer settings interface 1702, the user may activate a launch element 1712 to launch the offer publication 1602 to the target destinations, e.g., via social media, web sites, e-mail, or other similar methods of publication. For example, in response to the activation of launch element 1712, offer generating tool 138 may present offer publication 1602 to the target audience via social media sites, web sites, e-mail, or other similar contact methods, e.g., by posting messages on social media sites or walls, sending messages to users of the selected audience groups, e-mailing users of the selected audience groups, or other similar methods of communicating with the selected audience groups.

Figure 17:
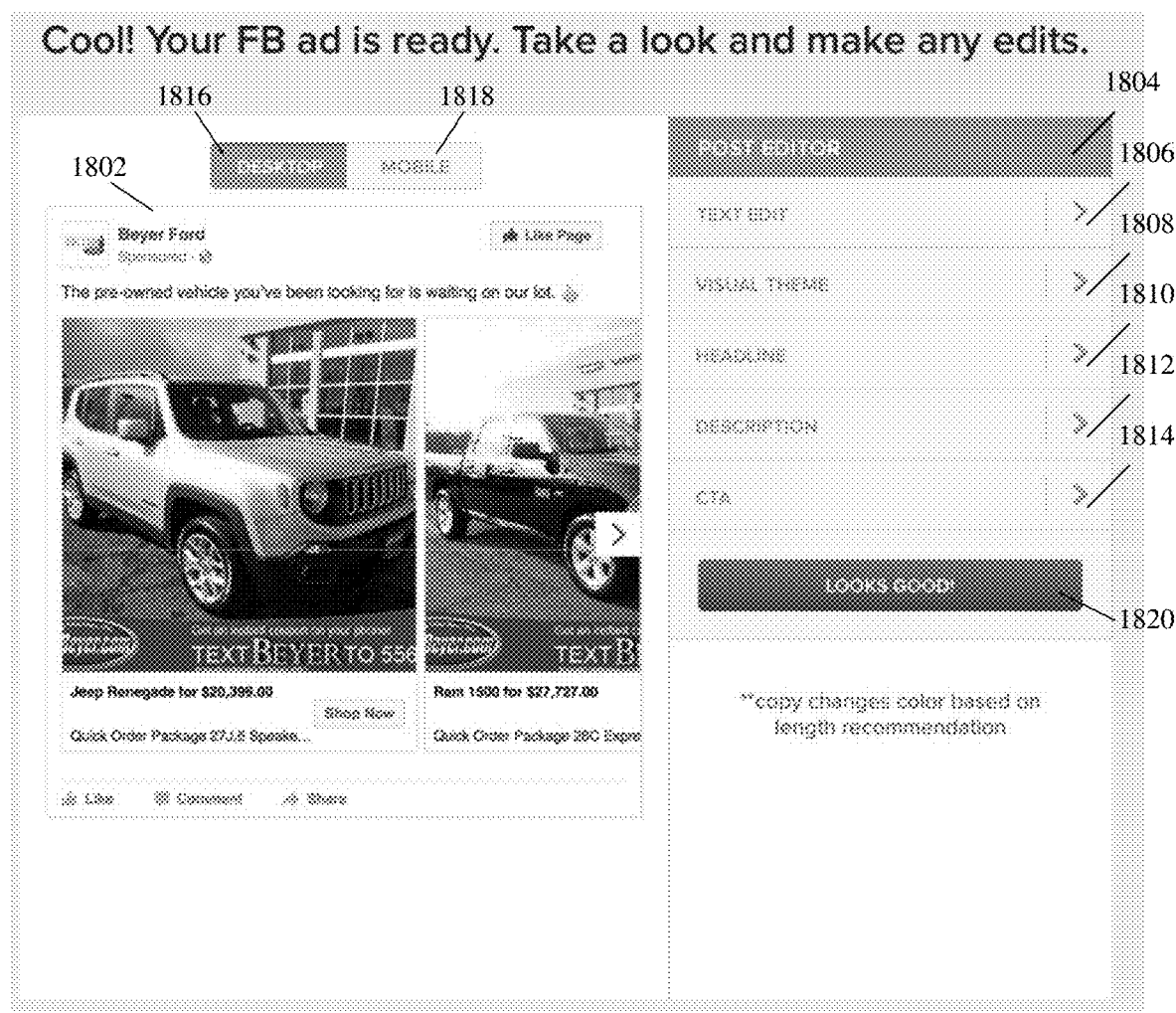

With reference now to FIGS. 4 and 10, and 17, in response to a user activation of new element 404, GUI 202 presents a user of computing device 110 with options for selecting a currently available used vehicle for the offer. For example, a listing of available vehicles may be presented in a similar manner to that illustrated in FIG. 10. The user may select one or more vehicles from the list 1002 or search for a vehicle using search field 906. In some aspects, for example, offer generating tool 138 may retrieve or receive inventory data 178 from the dealer data source 170 to populate the list 1002 of with used vehicles that are currently in inventory.

In response to the selecting one or more of the vehicles presented in list 1002, e.g., a used vehicle 1004, and the activation of next step element 1006, offer generating tool 138 may cause GUI 202 to present an interface for selecting what target location on the dealership's web site or system the offer publication for used vehicle should drive to, in a similar manner to the interface described above with respect to FIG. 14.

With reference now to FIG. 17, in response to the activation of one of the target elements of the interface for selecting the target location, the user with an offer publication 1802 for the used vehicle and a post editor interface 1804 for editing the offer publication 1802. Offer publication 1802 may be generated in a similar manner to offer publication 1602 as described above with reference to FIG. 15. Post editor interface 1804 may function in a similar manner to post editor interface 1804 as described above. For example, post editor interface 1804 may include a text edit element 1806, a visual theme element 1808, a headline element 1810, a description element 1812, and a CTA element 1814 that function in a similar manner to text edit element 1606, visual theme element 1608, headline element 1610, description element 1612, and CTA element 1614 as described above. The user may also be able to switch between desktop and mobile versions of the offer publication by activating desktop element 1816 and mobile element 1818 in a similar manner as described above for desktop element 1616 and mobile element 1618. Once the user is satisfied with the offer publication 1802, the user may activate looks good element 1820 to proceed to selection of offer settings as described above with reference to FIG. 16.

Figure 18:
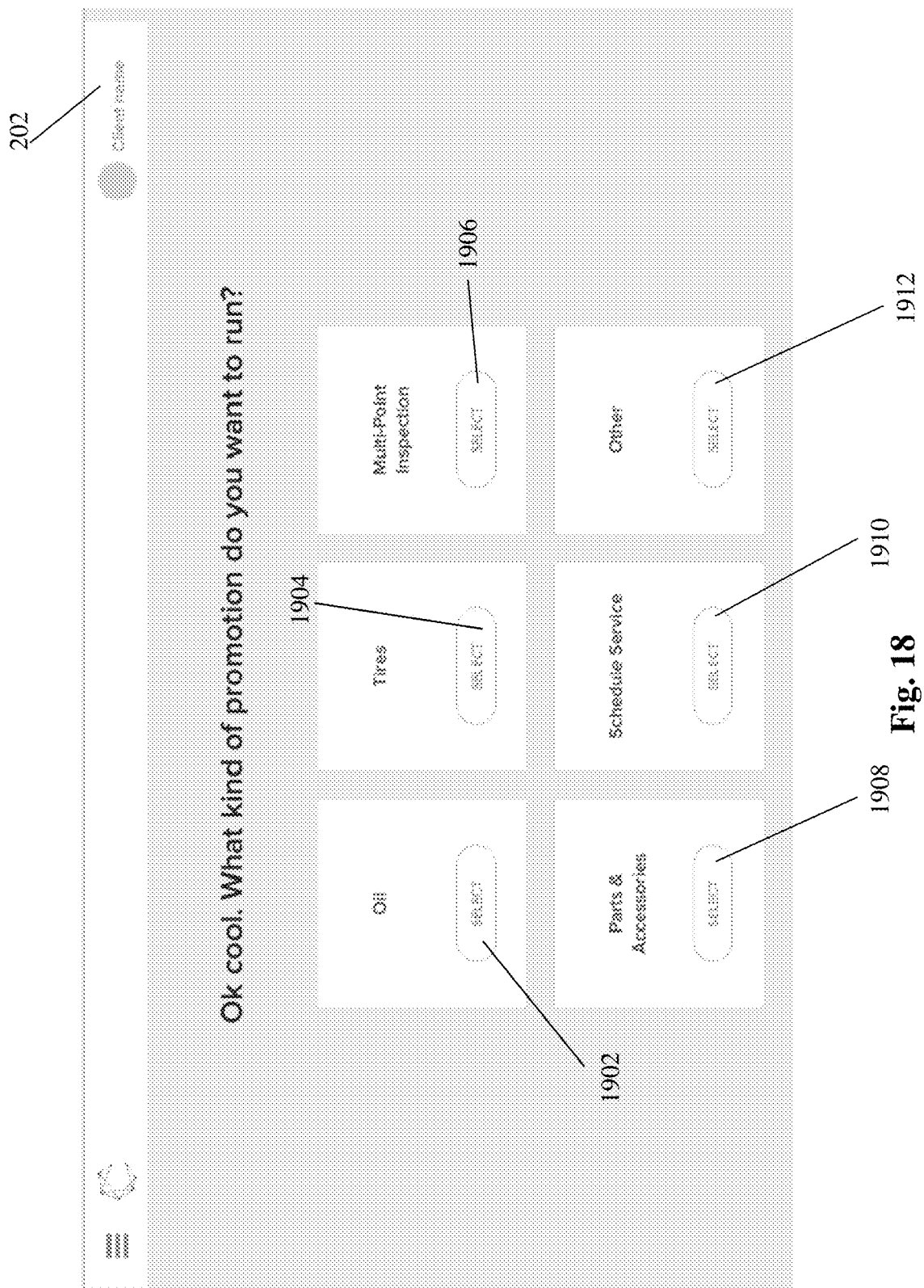
Figure 19:
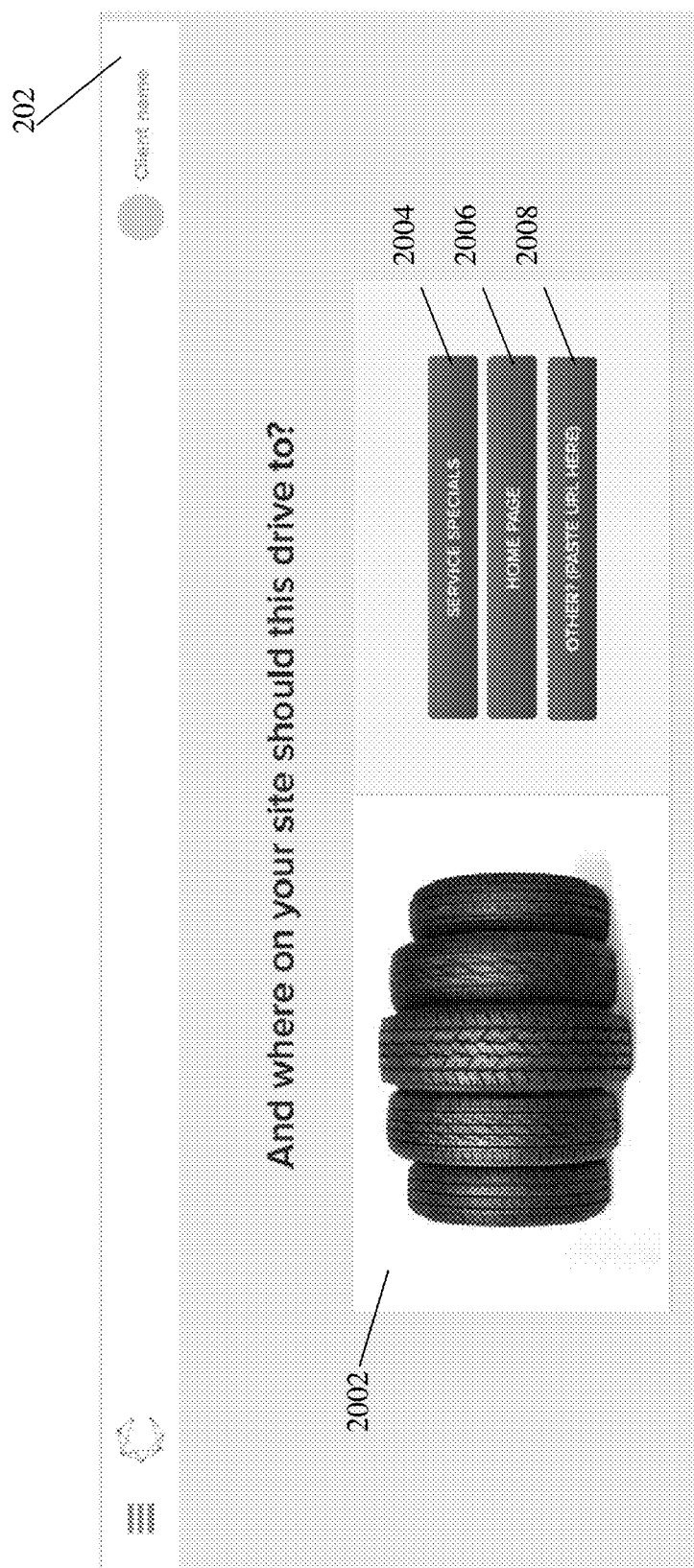

With reference now to FIGS. 18 and 19, an example flow when service and parts element 304 (FIG. 3) is activated by the user will now be described. In response to the activation of service and parts element 304, offer generating tool 138 may cause GUI 202 to present the user with various service and parts options including activatable elements such as, e.g., an oil element 1902, a tires element 1904, a multi-point inspection element 1906, a parts and accessories element 1908, a schedule service element 1910, and an other element 1912. In some aspects, for example, activation of oil element 1902 may allow the user to generate an offer for the sale of motor oil, activation of tires element 1904 may allow the user to generate an offer for the sale of tires, activation of multi-point inspection element 1906 may allow the user to generate an offer for a multi-point inspection service, activation of parts and accessories element 1908 may allow the user to generate an offer for various auto parts and accessories, activation of schedule service element 1910 may allow the user to generate an offer scheduling service appointments, e.g., oil change, tire rotation, etc., and activation of the other element 1912 may allow the user to generate an offer for any other part or service.

With reference now to FIG. 19, for example, in response to a user activation of tires element 1904, offer generating tool 138 may cause GUI 202 to present an interface for selecting what target location on the dealership's web site or system the offer publication for new tires should drive to, in a similar manner to the interface described above with respect to FIG. 15. For example, the interface may include an image of tires 2002, and target elements 2004, 2006, and 2008 that are activatable by the user, e.g., using input device 120, to select a target destination that the offer publication will drive to when a potential customer activates the offer publication. For example, activation of target element 2004 may set the offer publication to drive to a service specials offer page of the dealership's web site, activation of target element 2006 may set the offer publication to drive to the home page of the dealership, and activation of target element 2008 may allow the user to input a custom destination for the offer publication, e.g., the user may input a web link or other similar destination information using input device 120.

In some aspects, in response to an activation of a target element, offer generating tool 138 may cause GUI 202 to present the user with an offer publication for the tires and a post editor interface for editing the offer publication in a similar manner to that described above with reference to FIG. 16. Once the user is satisfied with the offer publication, the user may activate looks good element to proceed to selection of offer settings as described above with reference to FIG. 16 and publish the parts and service offer for the tires.

With reference now to FIGS. 20-28, additional or alternative interfaces that may be presented by offer generating tool 138 (FIG. 1) via graphical user interface (GUI) 202 will now be described.

Figure 20:
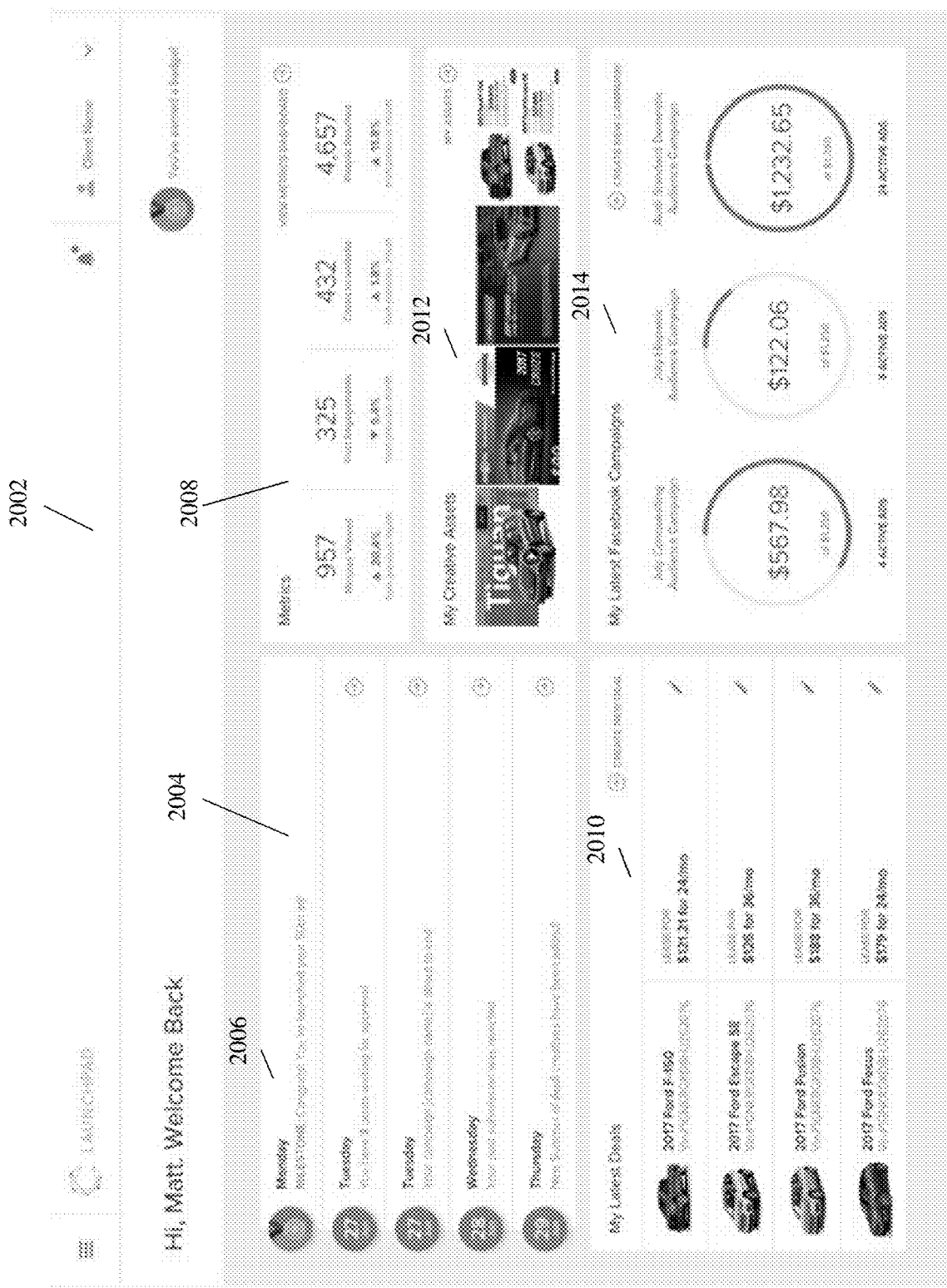

With reference now to FIG. 20, an example dashboard 2002 that may be presented by offer generating tool 138 (FIG. 1) is illustrated. Dashboard 2002 may include an event tracker 2004 that tracks events that occur on each day. In some aspects, event tracker 2004 may provide information on the status of various campaigns or publications that have been published using offer generating tool 138. In some aspects, milestones 2006 achieved by a user of offer generating tool may be tracked, for example, a number of offers placed, a number of views, number of clicks, number of people reached, or other similar milestones.

Dashboard may include a metrics summary 2008 presenting metrics information on current or prior campaigns or publications. For example, metrics summary 2008 may present information such as a number of minutes viewed, a number of post engagements, a number of clicks to a web site of the user, a number of people reached, or other similar metrics. In some aspects, the metrics may also or alternatively provide an amount of change of a metrics, for example, on a daily basis, weekly basis, monthly basis, quarterly basis, biannual basis, yearly basis or any other period of time.

Dashboard 2002 may include information about the latest deals generated using offer generating tool 138 in a latest deals summary 2010.

Dashboard 2002 may include a creative assets summary 2012 illustrating some creative assets, e.g., publications, generated using offer generating tool 138.

Dashboard 2002 may include information about current or prior campaigns that have been executed using offer generating tool 138 in a campaign summary 2014.

In some aspects, each of event summary 2004, metrics summary 2008, latest deals summary 2010, creative assets summary 2012, and campaign summary 2014, may include one or more elements that are activatable by a user of offer generating tool 138 to view more information related to the corresponding summary section or to create new deals, assets, campaigns, publication or other similar content associated with the corresponding summary section.

Figure 21A:
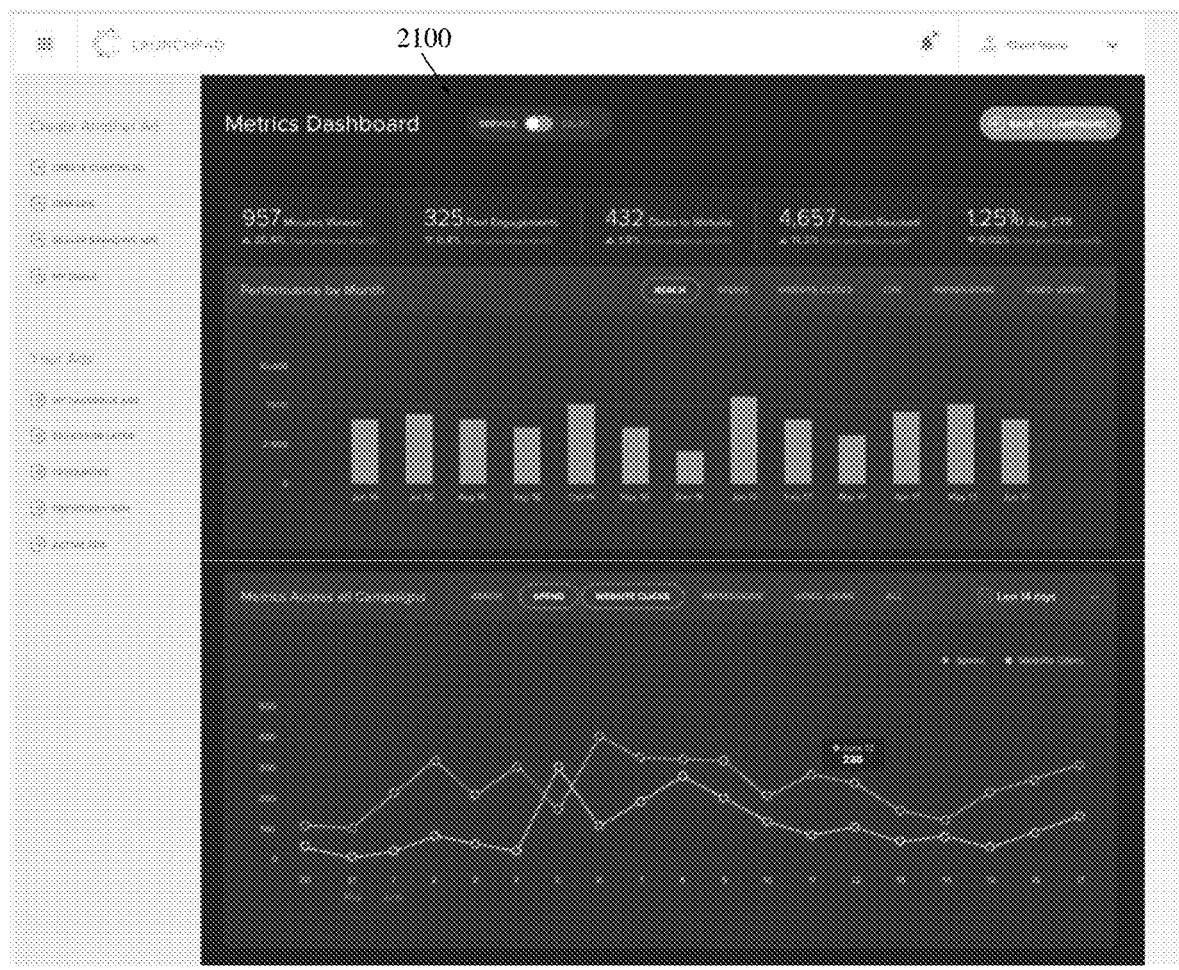
Figure 21B:
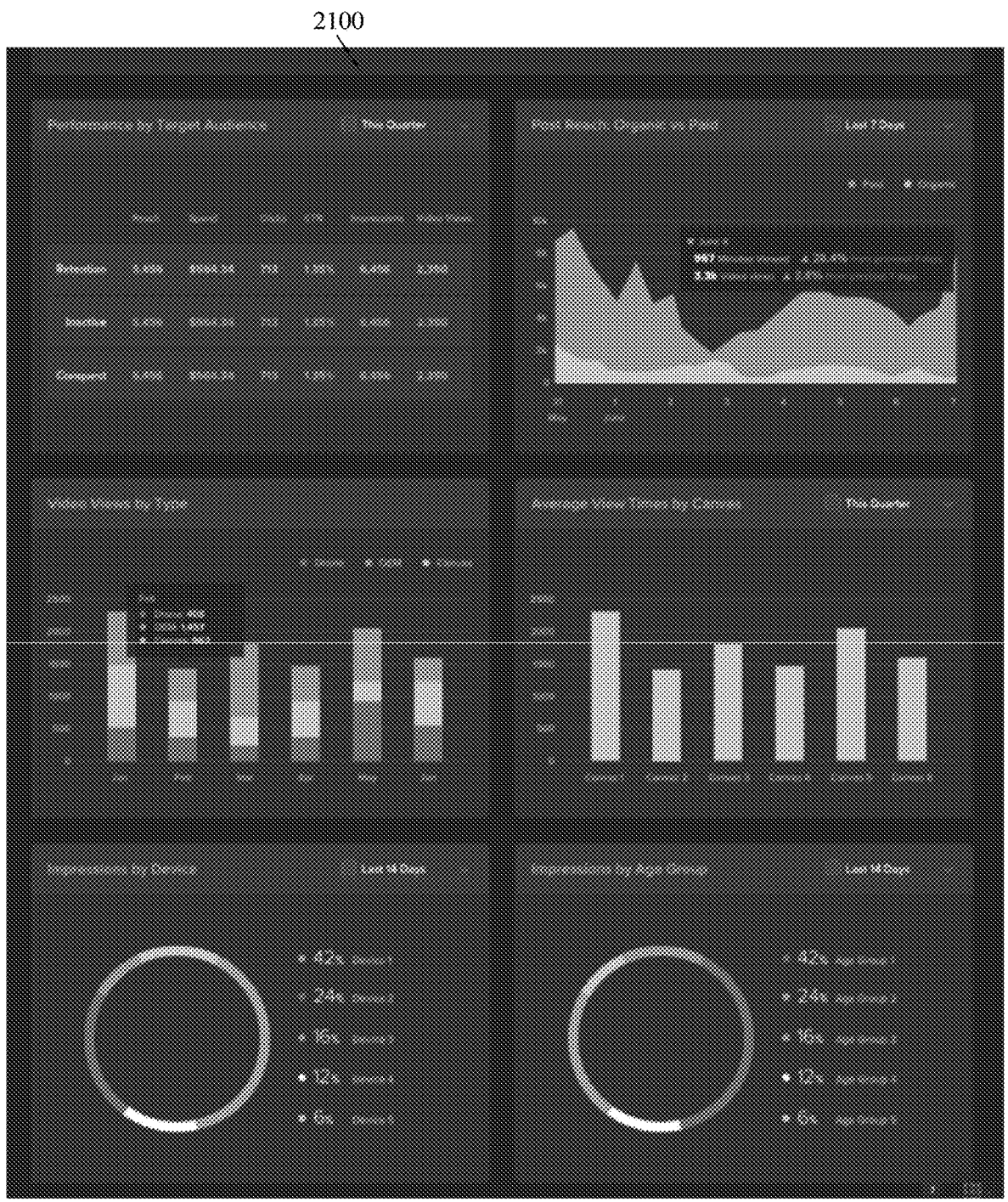

With reference now to FIGS. 21A and 21B, for example, when an activatable element associated with the metrics summary 2008 is activated, a metrics dashboard 2100 may be presented via GUI 202 by offer generating tool 138. Metrics dashboard 2100 presents metrics data related to publications and campaigns that are executed using offer generating tool 138. For example, metrics dashboard 2100 may present metrics data related to minutes viewed, post engagements, clicks to website, people reached, and average click-through rate (CTR), or other similar metrics.

In some aspects, metrics dashboard 2100 may present metrics data for a period of time, e.g., a month, in one or more graphs including, for example, reach, spend, website clicks, impressions, video views, or other similar metrics. Any other period of time may be used.

In some aspects, metrics dashboard 2100 may present metrics data across all campaigns including, for example, plotting charts including comparisons of various metrics such as, e.g., reach, spend, website clicks, impressions, video views, or other similar metrics. For example, each metric type may be activatable for display on the plotted chart and may be compared to the other metrics on the plotted chart. In some aspects, for example, some or all of the metrics may be plotted on the same chart for comparison. In some aspects, the metrics may be plotted against one another over a predetermined period of time, for example, a week, month, quarter, etc. Any other period of time may be used including, for example, 14 days or any other number of days.

In some aspects, metrics dashboard 2100 may present a performance of campaigns and publications based on the target audience. For example, retention, inactive, and conquest audiences may be compared under each metrics, e.g., reach, spend, clicks, CTR, impressions, video views, or other similar metrics.

In some aspects, metrics dashboard 2100 may present a comparison of the performance of both organic and paid campaigns and publications.

In some aspects, metrics dashboard 2100 may present a comparison of video views by type. For example, a comparison of drone video views, OEM video views, canvas video views, other methods of presenting a video.

In some aspects, metrics dashboard 2100 may present metrics comparing average view times by canvas. For example, metrics dashboard 2100 may show a comparison of the average view times for a number of different canvases over a pre-determined or selected period of time. In some aspects, the pre-determined period of time may be a day, week, month, quarter, or any other period of time.

In some aspects, metrics dashboard 2100 may present metrics comparing impressions by device. For example, metrics dashboard 2100 may show a comparison the impressions that users of different devices had to the campaigns and publications executed by offer generating tool 138 over a pre-determined or selected period of time. In some aspects, the pre-determined period of time may be a day, week, month, quarter, or any other period of time.

In some aspects, metrics dashboard 2100 may present metrics comparing impressions by age group. For example, metrics dashboard 2100 may show a comparison the impressions that users of different age groups had to the campaigns and publications executed by offer generating tool 138 over a pre-determined or selected period of time. In some aspects, the pre-determined period of time may be a day, week, month, quarter, or any other period of time.

With reference now to FIGS. 22-25, for example, when an activatable element associated with the campaigns summary 2014 is activated, a campaigns dashboard 2200 may be presented via GUI 202 by offer generating tool 138. Campaigns dashboard 2200 presents data related to campaigns that are executed using offer generating tool 138. For example, campaigns dashboard 2200 may present campaign data related to active and inactive campaigns and allow a user of offer generating tool 138 to monitor, adjust, or add new campaigns.

Figure 22:
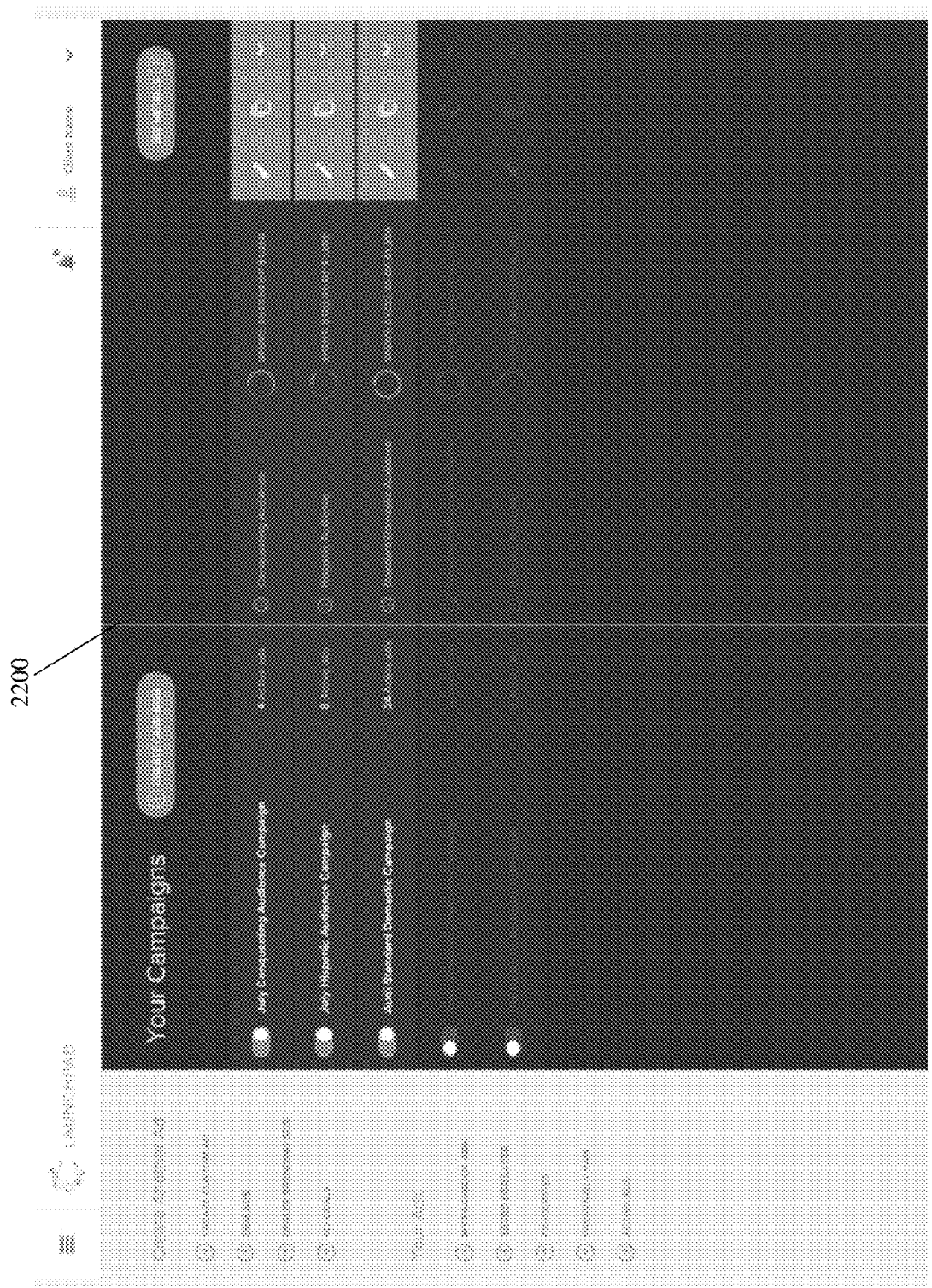

As illustrated in FIG. 22, for example, a user may be presented with a number of active campaigns, e.g., a July conquesting audience campaign, a July Hispanic audience campaign, and Audi standard domestic campaign. In some aspects, each campaign may provide additional information including, for example, the number of active offers, amount of money spent, amount of money expected to be spent, or other similar information.

Figure 23:
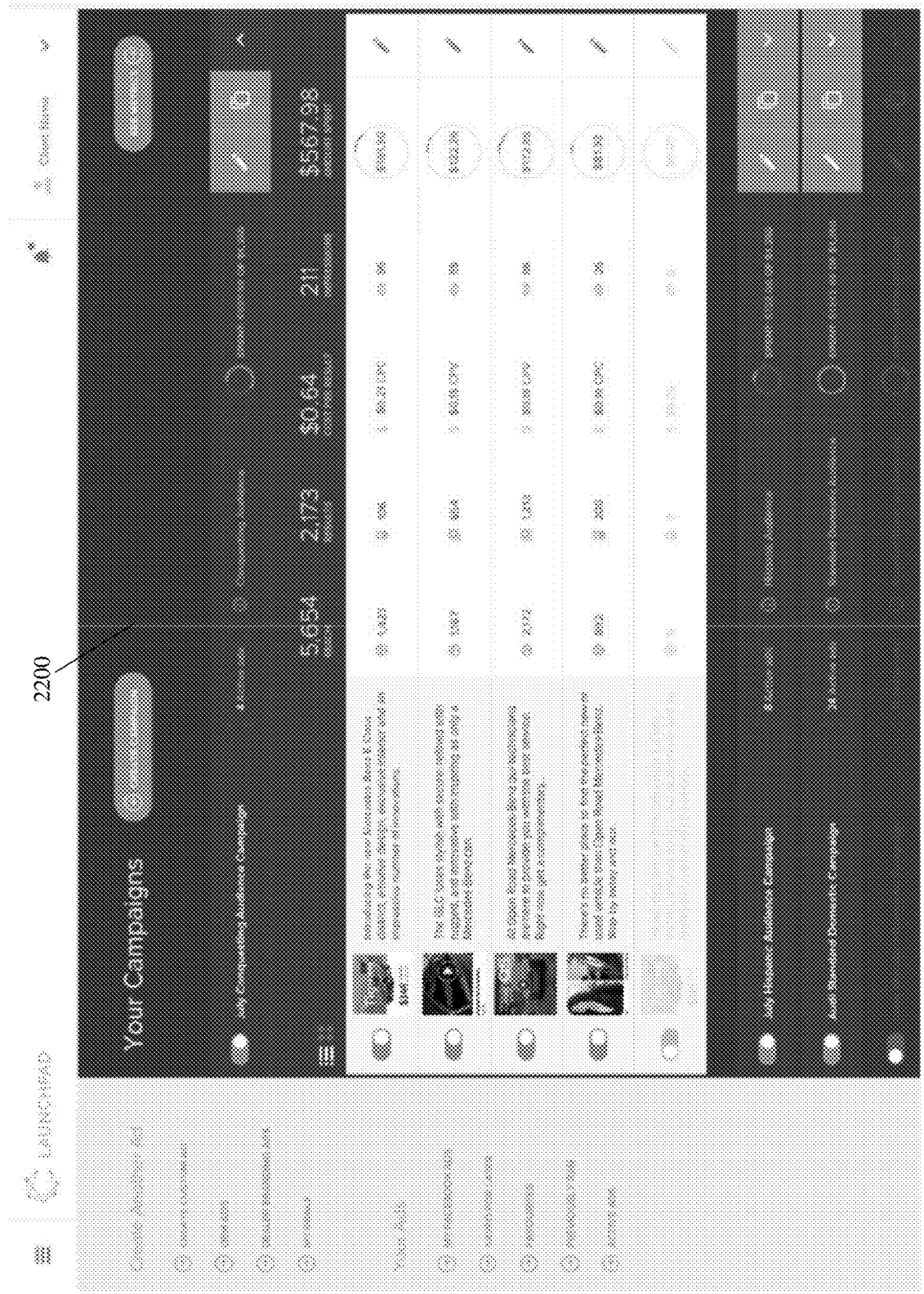
Figure 24:
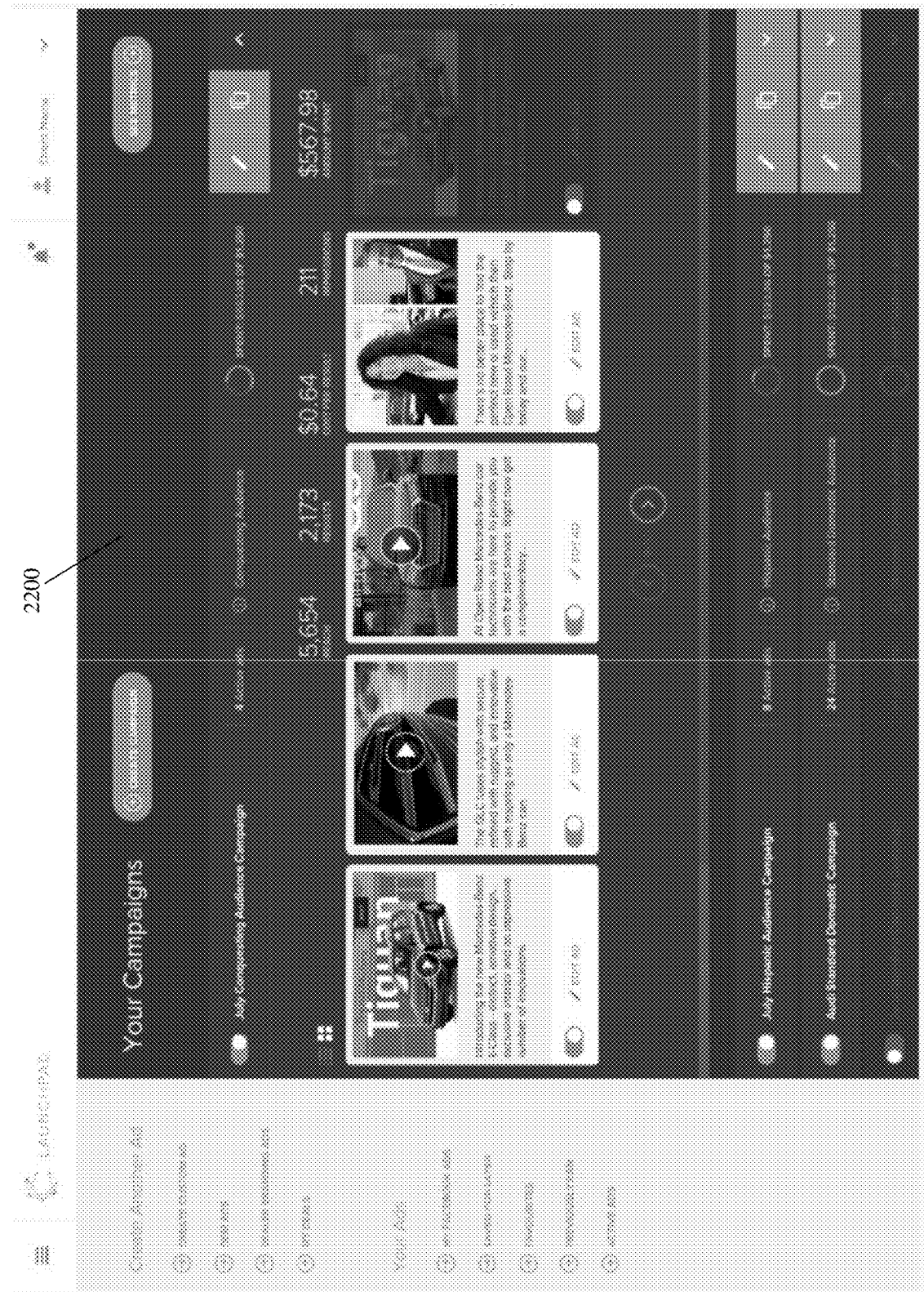

In some aspects, an element associated with a particular campaign may be activated to present more information on the campaign. For example, as illustrated in FIGS. 23 and 24, an element associated with the July conquesting campaign may be activated to provide additional information about each offer running in the campaign. For example, as illustrated in FIG. 23, the additional information may include including data about reach, results, cost per result, impression, amount spent, and other information about the campaign. As illustrated in FIG. 24, for example, the additional information may also or alternatively include enlarged images and corresponding information for current offers executing in the campaign.

Figure 25:
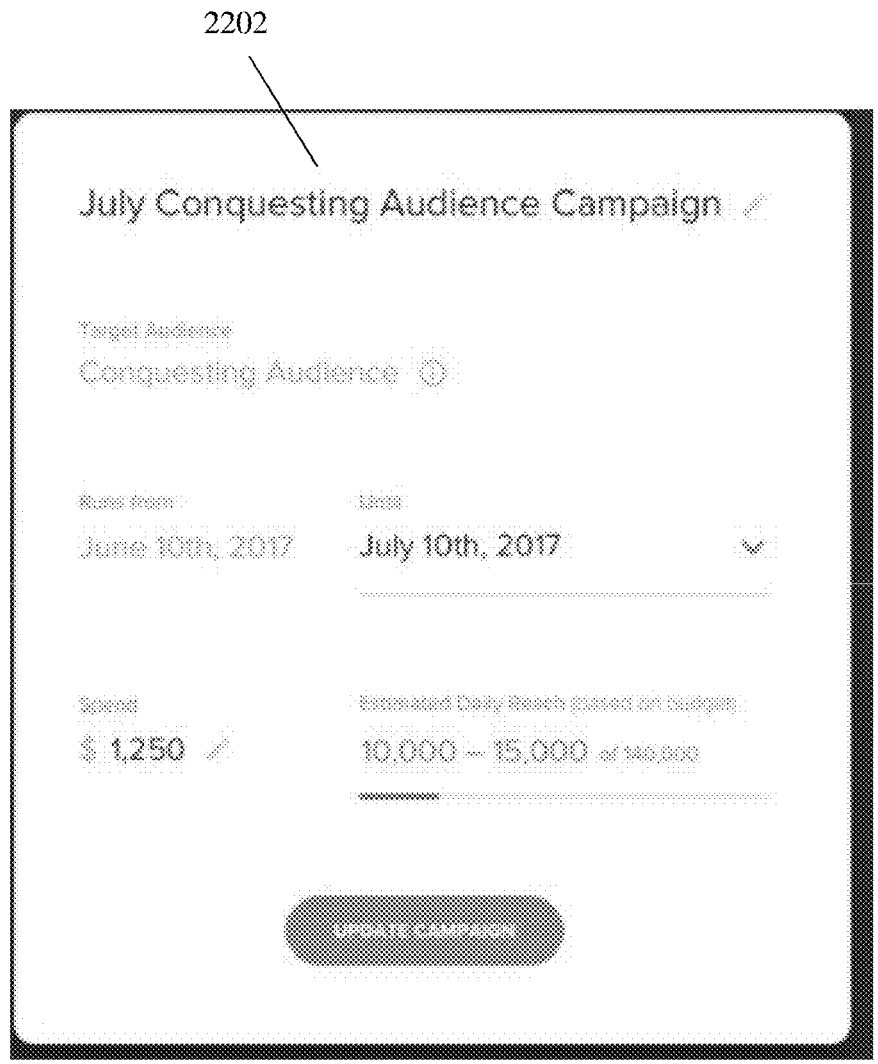

In some aspects, with reference to FIG. 25, an element associated with a particular campaign may be activated to present a user with an interface 2202 for modifying a campaign, e.g., the time, lengths, spend, or other similar aspects of the campaign.

Figure 26:
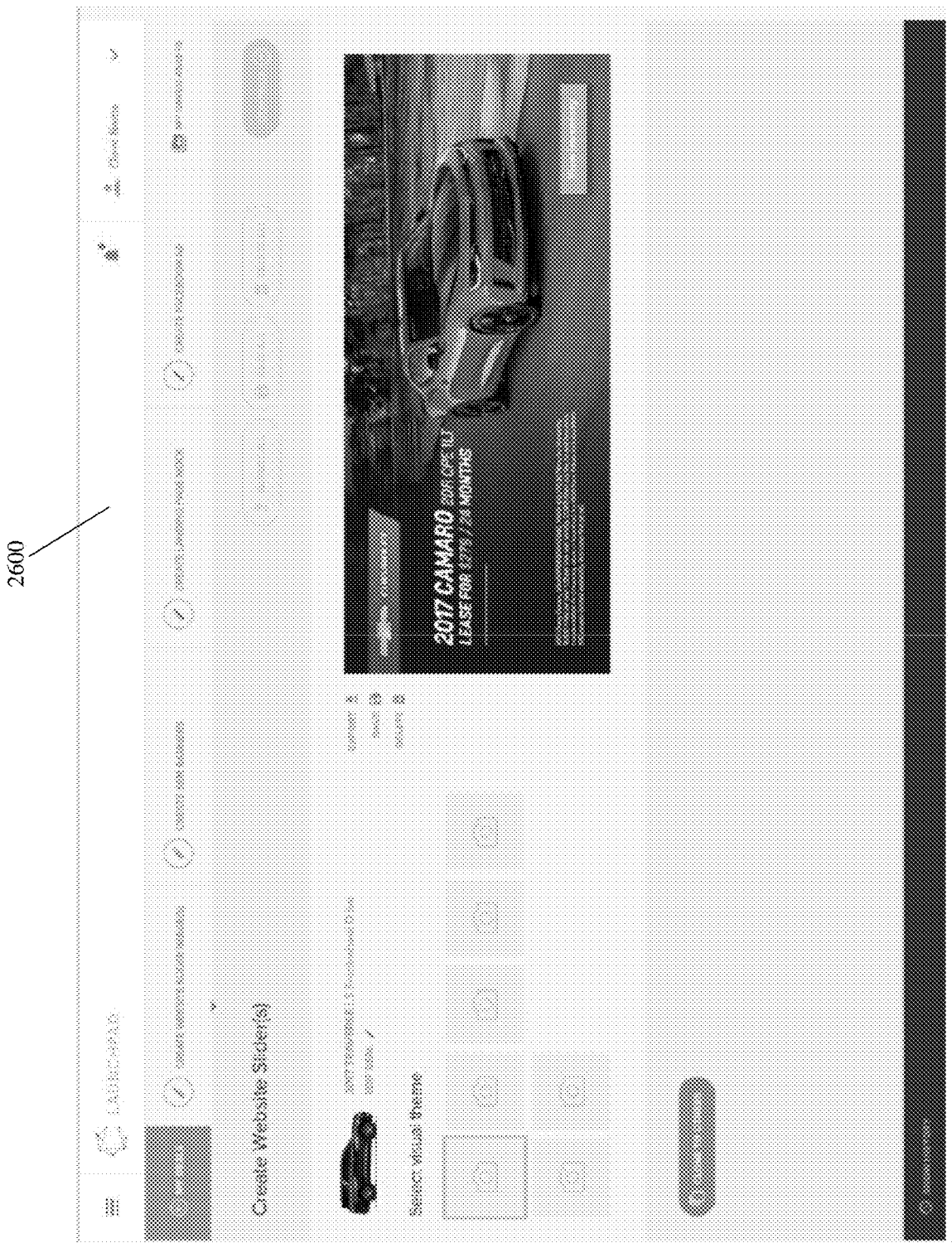
Figure 27:
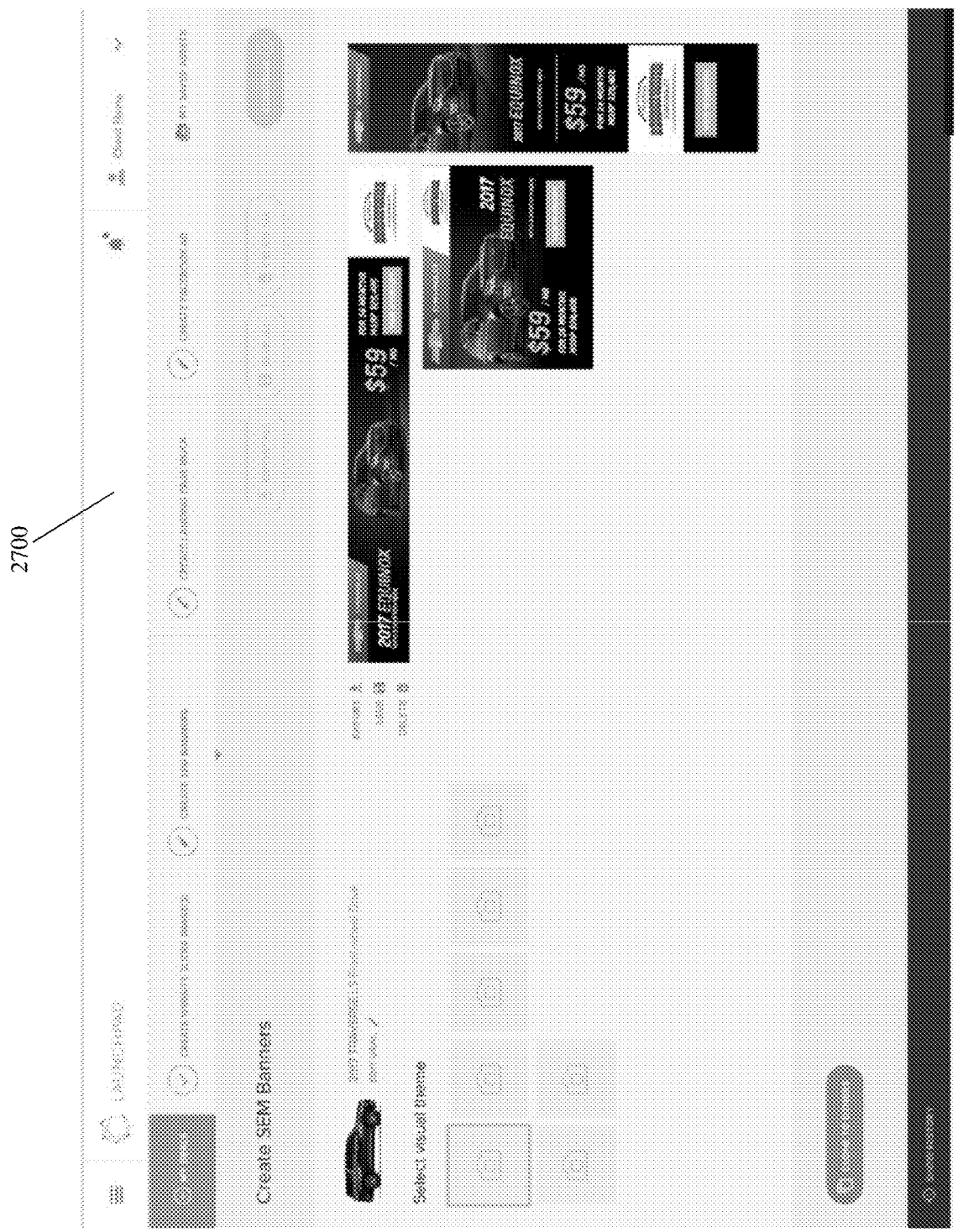
Figure 28:
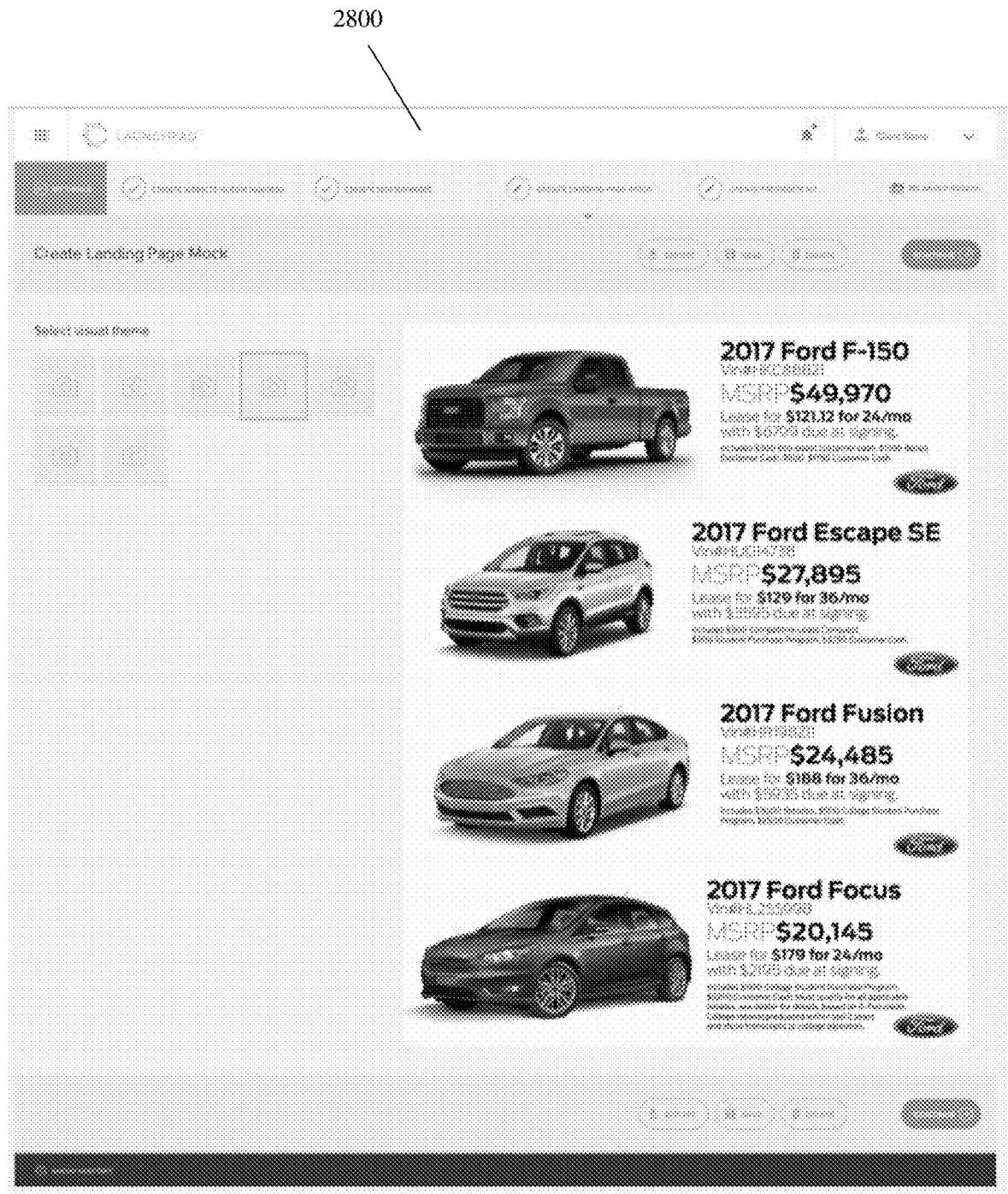

With reference now to FIGS. 26-28, for example, when an activatable element associated with the creative assets summary 2012 is activated, a variety of interfaces for generating creative assets using offer generating tool 138 may be presented via GUI 202. For example, a user may use the interfaces to generate creative assets for use in offers published on Facebook, e.g., as described above, website hero/slider creative assets (FIG. 26), search engine marketing (SEM) banner creative assets (FIG. 27), landing page creative assets (FIG. 28), or other kinds of creative assets that may be used in offers or campaigns.

As illustrated in FIG. 26, for example, a user may be presented with an interface 2600 for generating a website hero/slider creative asset. In some aspects, for example, the user may select a visual theme for each slide in the slider and provide details for the creative asset. A mockup of the creative asset may be generated based on the selected visual themes and the provided details and presented via GUI 202 to the user, for example, as illustrated in FIG. 26.

As illustrated in FIG. 27, for example, a user may be presented with an interface 2700 for generating a SEM banner creative asset. In some aspects, for example, the user may select a visual theme for the banner and provide details for the creative asset. A mockup of the creative asset may be generated based on the selected visual themes and the provided details and presented via GUI 202 to the user, for example, as illustrated in FIG. 27.

As illustrated in FIG. 28, for example, a user may be presented with an interface 2800 for generating a landing page creative asset. In some aspects, for example, the user may select a visual theme for the landing page and provide details for the creative asset. A mockup of the creative asset may be generated based on the selected visual themes and the provided details and presented via GUI 202 to the user, for example, as illustrated in FIG. 28.

Figure 29:
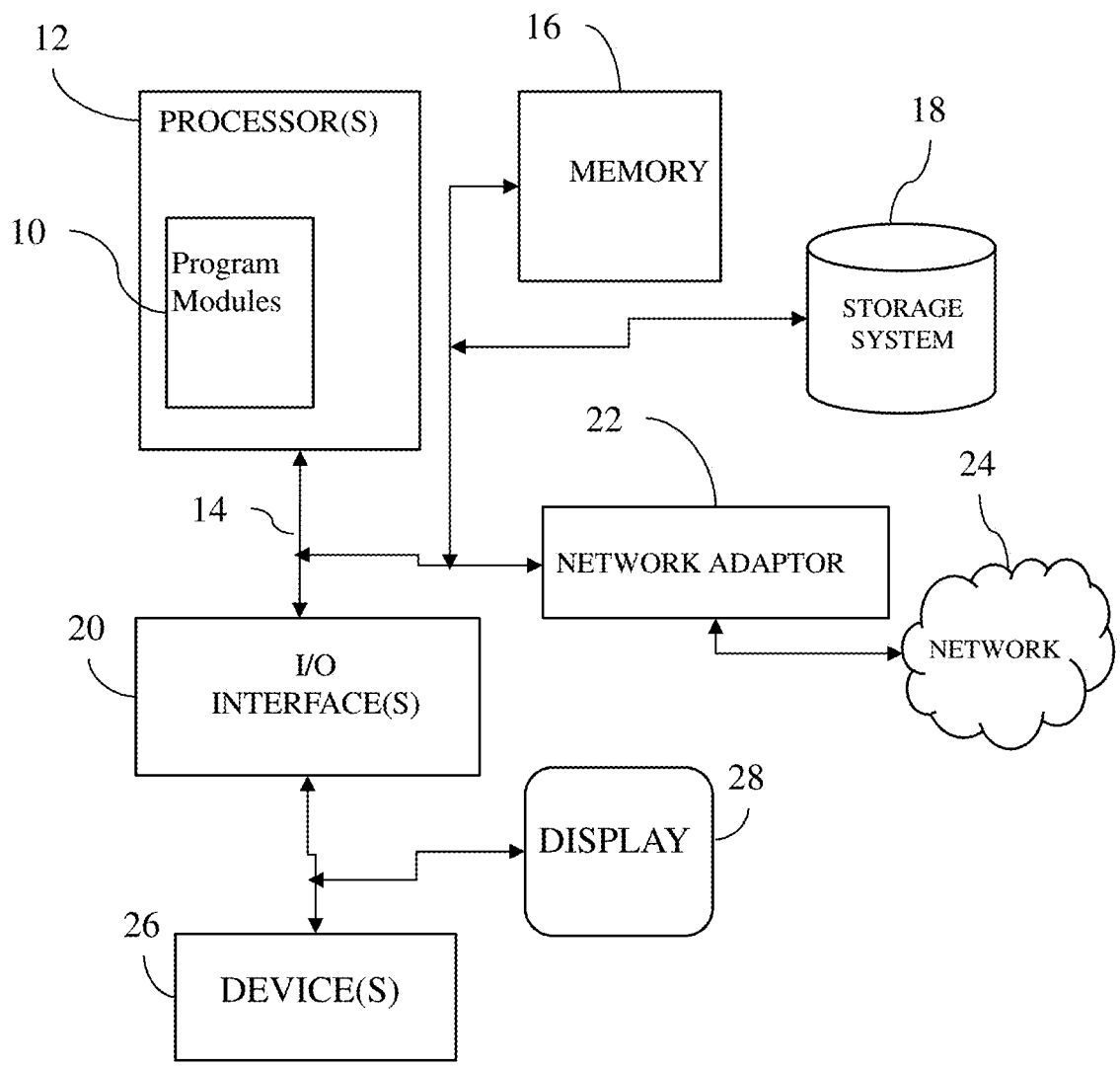
FIG. 29 is an exemplary block diagram of a computer system in which processes involved in the system, method, and computer program product described herein may be implemented.

FIG. 29 illustrates a schematic of an example computer or processing system that may implement any portion of system 100, computing device 110, server 130, third party data source 150, dealer data source 170, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to:

microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising:
   receiving from a first data source associated with a vehicle manufacturer, a plurality of incentives offered by the vehicle manufacturer for vehicles produced by the vehicle manufacturer;
   receiving from a second data source associated with a vehicle dealership, inventory data comprising data about a plurality of vehicles currently in stock at the vehicle dealership;
   causing a computing device associated with the vehicle dealership to present, via a display device, a graphical user interface to a user, the graphical user interface comprising an element activatable by the user to select a vehicle of the plurality of vehicles for the generation of an offer;
   receiving, from the computing device associated with the vehicle dealership, an activation of the element by the user, the activation selecting the vehicle for generation of an offer;
   determining, based on the plurality of incentives, at least one incentive for the selected vehicle;
   causing the computing device associated with the vehicle dealership to present to the user, via the graphical user interface, the at least one incentive for the selected vehicle;
   receiving, from the computing device associated with the vehicle dealership, a selection by the user of at least one of the incentives for the selected vehicle;
   receiving, from the computing device associated with the vehicle dealership, a selection by the user of a target publication destination;
   generating an offer for the selected vehicle based on the selected vehicle, the selected at least one of the incentives among the plurality of incentives offered by the vehicle manufacturer, and the selected target publication destination;
   causing the computing device associated with the vehicle dealership to present to the user, via the graphical user interface, the generated offer to the user;
   receiving, from the computing device associated with the vehicle dealership, an acceptance of the generated offer by the user;
   causing the computing device associated with the vehicle dealership to present to the user, via the graphical user interface, at least one audience setting for the generated offer, the at least one audience setting comprising a setting identifying a target audience;
   receiving, from the computing device associated with the vehicle dealership, a selection of the at least one audience setting by the user; and
   publishing, at the target publication destination, the generated offer on pages of the target audience identified in the selected at least one audience setting, wherein the pages of the target audience belong to the target publication destination.

2. The method of claim 1, wherein the inventory data comprises an identifier for each vehicle currently in stock at the vehicle dealership that uniquely identifies each vehicle, and wherein the generated offer comprises the identifier that uniquely identifies the selected vehicle.

3. The method of claim 2, wherein the identifier is a vehicle identification number (VIN) for the selected vehicle.

4. The method of claim 1, further comprising receiving vehicle data from the first data source for the selected vehicle, the vehicle data comprising a plurality of images of the selected vehicle, wherein the generated offer includes at least one of the images of the selected vehicle.

5. The method of claim 1, wherein the first data source is run by a third party that is different than the vehicle manufacturer and the vehicle dealership.

6. The method of claim 1, wherein the generated offer comprises at least one component, the generated offer generated based on at least one component template, the at least one component template defining a format for the at least one component of the generated offer.

7. The method of claim 6, wherein the at least one component comprises an image of the selected vehicle, the selected at least one of the incentives, and a unique identifier of the selected vehicle, the at least one component template defining a position of each of the image of the selected vehicle, the selected at least one of the incentives, and the unique identifier of the selected vehicle in the generated offer.

8. A system comprising:
   at least one processor; and
   memory storing instructions that, when executed by the at least one processor, cause the at least one processor to:
      receive from a first data source associated with a vehicle manufacturer, a plurality of incentives offered by the vehicle manufacturer for vehicles produced by the vehicle manufacturer;
      receive from a second data source associated with a vehicle dealership, inventory data comprising data about a plurality of vehicles currently in stock at the vehicle dealership;
      cause a computing device associated with the vehicle dealership to present, via a display device, a graphical user interface to a user, the graphical user interface comprising an element activatable by the user to select a vehicle of the plurality of vehicles for the generation of an offer;
      receive, from the computing device associated with the vehicle dealership, an activation of the element by the user, the activation selecting the vehicle for generation of an offer;
      determine, based on the plurality of incentives, at least one incentive for the selected vehicle;
      cause the computing device associated with the vehicle dealership to present to the user, via the graphical user interface, the at least one incentive for the selected vehicle;
      receive, from the computing device associated with the vehicle dealership, a selection by the user of at least one of the incentives for the selected vehicle;
      receive, from the computing device associated with the vehicle dealership, a selection by the user of a target publication destination;
      generate an offer for the selected vehicle based on the selected vehicle, the selected at least one of the incentives among the plurality of incentives offered by the vehicle manufacturer, and the selected target publication destination;
      cause the computing device associated with the vehicle dealership to present to the user, via the graphical user interface, the generated offer to the user;

receive, from the computing device associated with the vehicle dealership, an acceptance of the generated offer by the user;

cause the computing device associated with the vehicle dealership to present to the user, via the graphical user interface, at least one audience setting for the generated offer, the at least one audience setting comprising a setting identifying a target audience;

receive, from the computing device associated with the vehicle dealership, a selection of the at least one audience setting by the user; and publish, at the target publication destination, the generated offer on pages of the target audience identified in the selected at least one audience setting, wherein the pages of the target audience belong to the target publication destination.

9. The system of claim 8, wherein the inventory data comprises an identifier for each vehicle currently in stock at the vehicle dealership that uniquely identifies each vehicle, and wherein the generated offer comprises the identifier that uniquely identifies the selected vehicle.

10. The system of claim 9, wherein the identifier is a vehicle identification number (VIN) for the selected vehicle.

11. The system of claim 8, the at least one hardware processor further configured to:

receive vehicle data from the first data source for the selected vehicle, the vehicle data comprising a plurality of images of the selected vehicle, wherein the generated offer includes at least one of the images of the selected vehicle.

12. The system of claim 8, wherein the first data source is run by a third party that is different than the vehicle manufacturer and the vehicle dealership.

13. The system of claim 8, wherein the generated offer comprises at least one component, the generated offer generated based on at least one component template, the at least one component template defining a format for the at least one component of the generated offer.

14. The system of claim 13, wherein the at least one component comprises an image of the selected vehicle, the selected at least one of the incentives, and a unique identifier of the selected vehicle, the at least one component template defining a position of each of the image of the selected vehicle, the selected at least one of the incentives, and the unique identifier of the selected vehicle in the generated offer.

15. A non-transitory computer readable medium comprising instructions that, when executed by at least one hardware processor, configure the at least one hardware processor to:

receive from a first data source associated with a vehicle manufacturer, a plurality of incentives offered by the vehicle manufacturer for vehicles produced by the vehicle manufacturer;

receive from a second data source associated with a vehicle dealership, inventory data comprising data about a plurality of vehicles currently in stock at the vehicle dealership;

cause a computing device associated with the vehicle dealership to present, via a display device, a graphical user interface to a user, the graphical user interface comprising an element activatable by the user to select a vehicle of the plurality of vehicles for the generation of an offer;

receive, from the computing device associated with the vehicle dealership, an activation of the element by the user, the activation selecting the vehicle for generation of an offer;

determine, based on the plurality of incentives, at least one incentive for the selected vehicle;

cause the computing device associated with the vehicle dealership to present to the user, via the graphical user interface, the at least one incentive for the selected vehicle;

receive, from the computing device associated with the vehicle dealership, a selection by the user of at least one of the incentives for the selected vehicle;

receive, from the computing device associated with the vehicle dealership, a selection by the user of a target publication destination;

generate an offer for the selected vehicle based on the selected vehicle, the selected at least one of the incentives among the plurality of incentives offered by the vehicle manufacturer, and the selected target publication destination;

cause the computing device associated with the vehicle dealership to present to the user, via the graphical user interface, the generated offer to the user;

receive, from the computing device associated with the vehicle dealership, an acceptance of the generated offer by the user;

cause the computing device associated with the vehicle dealership to present to the user, via the graphical user interface, at least one audience setting for the generated offer, the at least one audience setting comprising a setting identifying a target audience;

receive, from the computing device associated with the vehicle dealership, a selection of the at least one audience setting by the user; and publish, at the target publication destination, the generated offer on pages of the target audience identified in the selected at least one audience setting, wherein the pages of the target audience belong to the target publication destination.

16. The non-transitory computer readable medium of claim 15, wherein the inventory data comprises an identifier for each vehicle currently in stock at the vehicle dealership that uniquely identifies each vehicle, and wherein the generated offer comprises the identifier that uniquely identifies the selected vehicle.

17. The non-transitory computer readable medium of claim 16, wherein the identifier is a vehicle identification number (VIN) for the selected vehicle.

18. The non-transitory computer readable medium of claim 15, the at least one hardware processor further configured to:

receive vehicle data from the first data source for the selected vehicle, the vehicle data comprising a plurality of images of the selected vehicle, wherein the generated offer includes at least one of the images of the selected vehicle.

19. The non-transitory computer readable medium of claim 15, wherein the generated offer comprises at least one component, the generated offer generated based on at least one component template, the at least one component template defining a format for the at least one component of the generated offer.

20. The non-transitory computer readable medium of claim 19, wherein the at least one component comprises an image of the selected vehicle, the selected at least one of the incentives, and a unique identifier of the selected vehicle, the at least one component template defining a position of each of the image of the selected vehicle, the selected at least one of the incentives, and the unique identifier of the selected vehicle in the generated offer.

* * * * *